United States Patent [19]

Nishitake et al.

[11] Patent Number: 5,072,966
[45] Date of Patent: Dec. 17, 1991

[54] ENERGY ABSORBING STRUCTURE FOR VEHICLE BODY SIDE PORTION

[75] Inventors: Hideki Nishitake; Toshihiro Ishikawa, both of Hiroshima; Haruhisa Kore, Kure; Kenichi Okuda; Kazuhiro Murashige, both of Hiroshima, all of Japan

[73] Assignee: Mazda Motor Corporation, Hiroshima, Japan

[21] Appl. No.: 666,870

[22] Filed: Mar. 8, 1991

[30] Foreign Application Priority Data

| Mar. 13, 1990 | [JP] | Japan | 2-63554 |
| Mar. 24, 1990 | [JP] | Japan | 2-74791 |
| Mar. 24, 1990 | [JP] | Japan | 2-74792 |
| Feb. 12, 1991 | [JP] | Japan | 3-18679 |

[51] Int. Cl.⁵ ............................................. B60R 21/16
[52] U.S. Cl. ..................................... 280/730; 280/734; 180/274
[58] Field of Search ............... 280/728, 729, 730, 734, 280/735, 743; 180/274

[56] References Cited

U.S. PATENT DOCUMENTS

| 4,1262,931 | 4/1981 | Strasser et al. | 280/743 |
| 3,753,475 | 8/1973 | Anderson et al. | 280/735 |
| 3,767,002 | 10/1973 | Gillund | 280/735 |
| 3,791,667 | 2/1974 | Haviland | 280/730 |
| 3,884,497 | 5/1975 | Massengill et al. | 280/730 |
| 4,966,388 | 10/1990 | Warner et al. | 280/730 |

FOREIGN PATENT DOCUMENTS 1117957 9/1989 Japan .
0283545 11/1990 Japan .................................. 280/728

Primary Examiner—Kenneth R. Rice
Assistant Examiner—Paul Dickson
Attorney, Agent, or Firm—Price, Heneveld, Cooper, DeWitt & Litton

[57] ABSTRACT

An energy absorbing structure for a vehicle body side portion, includes a pair of vehicle body members constituting two side portions of a vehicle body, a pair of collision detection sensors for respectively detecting collisions on two side surfaces of the vehicle body, one air bag which is mounted in each vehicle body member, can be unfolded toward the interior of a passenger room, and can receive at least one passenger who is moved sideways by a side collision in an unfolded state, a timing varying unit for changing unfolding timings of the two air bags in accordance with a side-collision direction on the basis of detection results from the collision detection sensors, and an air bag unfolding device for unfolding the air bags in accordance with the unfolding timings set by the timing varying unit.

31 Claims, 23 Drawing Sheets

ENERGY ABSORBING STRUCTURE FOR VEHICLE BODY SIDE PORTION

BACKGROUND OF THE INVENTION

The present invention relates to an energy absorbing structure for a vehicle body side portion using an air bag.

In recent years, an attempt is made in some vehicles to arrange an air bag for absorbing and relaxing an impact force in a front portion of a passenger room in view of protection of passengers upon collision. In practice, remarkable effects have been experienced.

Passenger protection upon collision of vehicles must be considered not only for a head-on collision but also for a side collision of vehicles. From this point of view, for example, Japanese Utility Model Laid-Open No. 1-117957 proposes a mechanism wherein an air bag is arranged in an armrest of a door constituting a vehicle side portion, and is unfolded toward the interior of a passenger room upon side collision of vehicles, thereby absorbing and relaxing an impact force acting on a passenger.

In general, an air bag is unfolded (inflated) by a gas injected at high speed from an inflator into the air bag, and when a gas is filled in the air bag in a sealed state, a repulsion force of the air bag becomes too strong, and passenger protection performance may be impaired accordingly. For these reasons, a vent hole for appropriately exhausting a gas is formed, and when the passenger abuts against the unfolded air bag, the air bag is collapsed while exhausting the gas from the vent hole, thereby assuring an unfolded state suitable for absorbing a shock.

However, such a structure has an inevitable drawback in that a gas amount becomes short after an elapse of a predetermined period of time from the beginning of unfolding, and the air bag becomes deflated so as not to assure a sufficient shock absorbing effect since the gas amount injected from the inflator is not infinite but is limited.

Meanwhile, a time from when a side collision of vehicles occurs until a passenger actually collides against an inner wall portion in a passenger room is not constant. For example, assume the following side-collision state. That is, in a state wherein a passenger sits on a driver's seat of a vehicle in which air bags are arranged in both right and left door portions, if another vehicle collides against the door portion on the driver's seat side, the passenger temporarily moves toward the door on the driver's seat side by the inertia immediately after the collision (FIG. 5), and then moves toward a front passenger's seat by a counterforce (FIG. 6). For this reason, there is a large time lag between a timing at which the passenger collides against the door on the driver's seat side and a timing at which he or she collides against the door on the front passenger's seat side.

Therefore, the right and left air bags wait for the passenger in the optimal unfolded state under such a condition. However, by the time the passenger is thrown out toward the front passenger's seat side, the air bag on the front passenger's seat side may have begun to be deflated from the optimal unfolded state.

The conventional mechanism does not sufficiently consider a variation in collision timing of a passenger against the inner wall portion of the vehicle body, and there is a room for improvement in terms of improvement of passenger protection performance.

SUMMARY OF THE INVENTION

The present invention has been made in consideration of the above situation, and has as its object to provide an energy absorbing structure for a vehicle body side portion, which varies an unfolding timing of an air bag in correspondence with a collision timing of a passenger against an inner wall portion of a vehicle body, thereby further improving its protection performance.

It is another object of the present invention to provide an energy absorbing structure for a vehicle body side portion, which can effectively prevent a secondary collision of a passenger and a vehicle body in a side-collision state.

It is still another object of the present invention to provide an energy absorbing structure for a vehicle body side portion, which can effectively prevent a tertiary collision of a passenger and a vehicle body in a side-collision state.

In order to achieve the above object, according to a first aspect of the present invention, there is provided an energy absorbing structure for a vehicle body side portion, comprising: a pair of vehicle body members constituting two side portions of a vehicle body, a pair of collision detection means for respectively detecting collisions on two side surfaces of the vehicle body, one air bag which is mounted in each of the vehicle body members, can be unfolded toward an interior of a passenger room, and can receive at least one passenger who is moved sideways by a side collision in an unfolded state, timing varying means for changing unfolding timings of the two air bags in accordance with a side-collision direction on the basis of detection results from the collision detection means, and air bag unfolding means for unfolding the air bags in accordance with the unfolding timings set by the timing varying means.

According to a second aspect of the present invention, there is provided an energy absorbing structure for a vehicle body side portion, comprising: a pair of vehicle body members constituting two side portions of a vehicle body, a pair of collision detection means for respectively detecting collisions on two side surfaces of the vehicle body, a pair of air bags which are mounted in each of the vehicle body members, can be unfolded toward an interior of a passenger room, and can receive at least one passenger who is moved sideways by a side collision in an unfolded state, timing varying means for changing unfolding timings of the four air bags in accordance with a side-collision direction on the basis of detection results from the collision detection means, and air bag unfolding means for unfolding the air bags in accordance with the unfolding timings set by the timing varying means.

According to a third aspect of the present invention, there is provided an energy absorbing structure for a vehicle body side portion, comprising: a pair of vehicle body members constituting two side portions of a vehicle body, a pair of collision detection means for respectively detecting collisions on two side surfaces of the vehicle body, one air bag which is mounted in each of the vehicle body members, a portion of which can be unfolded toward an interior of a passenger room as a first air bag portion having a standard size, the remaining portion of which can be unfolded as a second air bag portion larger than the first air bag portion, and which can receive at least one passenger who is moved sideways by a side collision in an unfolded state of each of the first and second air bag portions, timing varying means for changing unfolding timings of the four air bag portions in accordance with a side-collision direction on the basis of detection results from the collision detection means, and air bag unfolding means for unfolding the air bag portions in accordance with the unfolding timings set by the timing varying means.

According to a fourth aspect of the present invention, there is provided an energy absorbing structure for a vehicle body side portion, comprising: a pair of vehicle body members constituting two side portions of a vehicle body, a pair of collision detection means for respectively detecting collisions on two side surfaces of the vehicle body, a pair of large and small air bags which are mounted in each of the vehicle body members, can be independently unfolded toward an interior of a passenger room, and can receive at least one passenger who is moved sideways by a side collision in an unfolded state, timing varying means for changing timings up to fully unfolded states of the four air bags in accordance with a side-collision direction on the basis of detection results from the collision detection means, and air bag unfolding means for unfolding the air bags in accordance with the timings set by the timing varying means.

Other features and advantages of the present invention will be apparent from the following description taken in conjunction with the accompanying drawings, in which like reference characters designate the same or similar parts throughout the figures thereof.

DETAILED DESCRIPTION OF THE PREFERRED EMBODIMENTS

An energy absorbing structure for a vehicle body side portion according to the first embodiment of the present invention will be described in detail hereinafter with reference to FIGS. 1 to 12. In this case, the present invention is applied to a side air bag apparatus.

Figure 1:
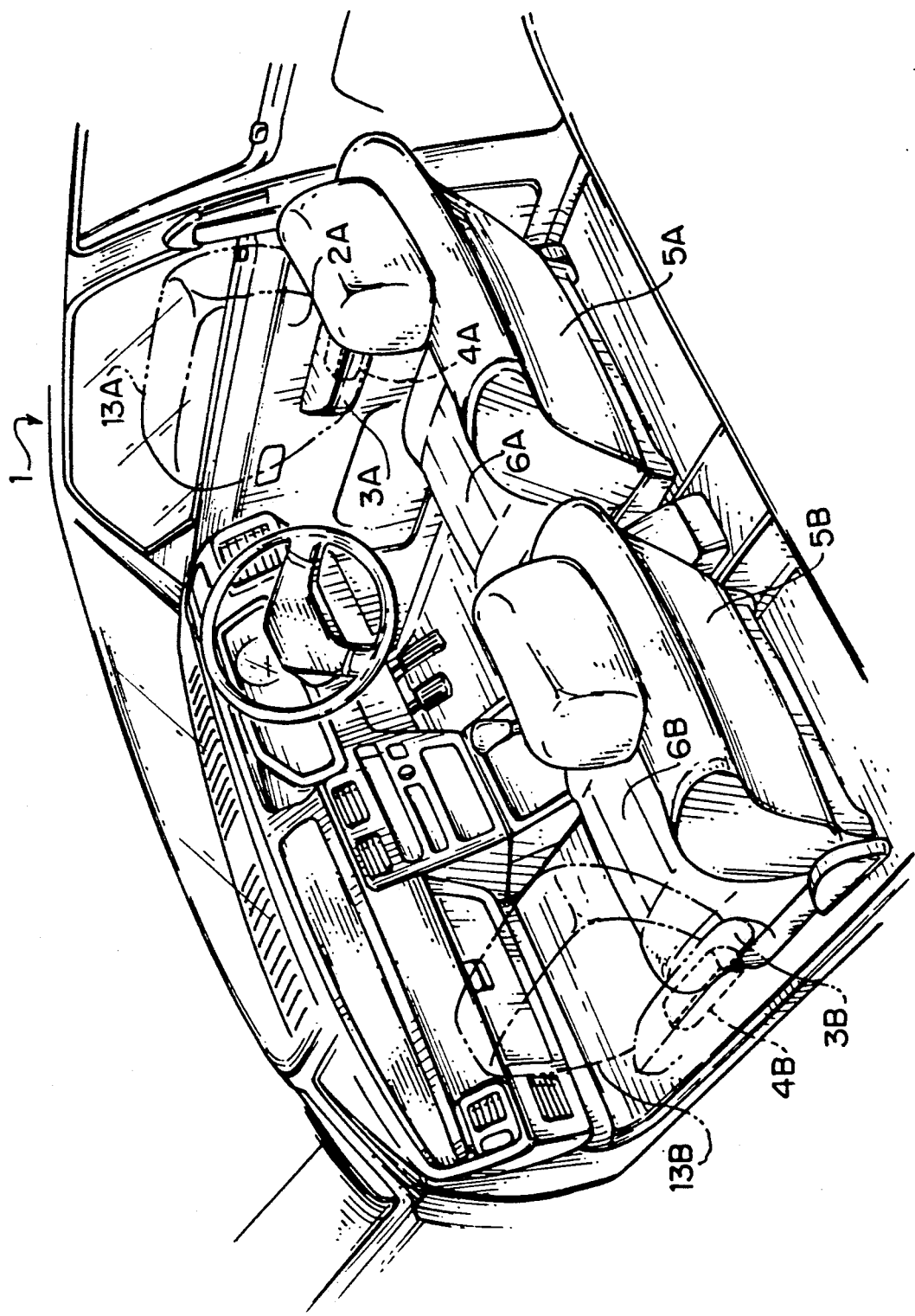
FIG. 1 is a perspective view showing an internal structure of a vehicle to which an energy absorbing structure for a vehicle body side portion according to the first embodiment of the present invention is applied
Figure 2:
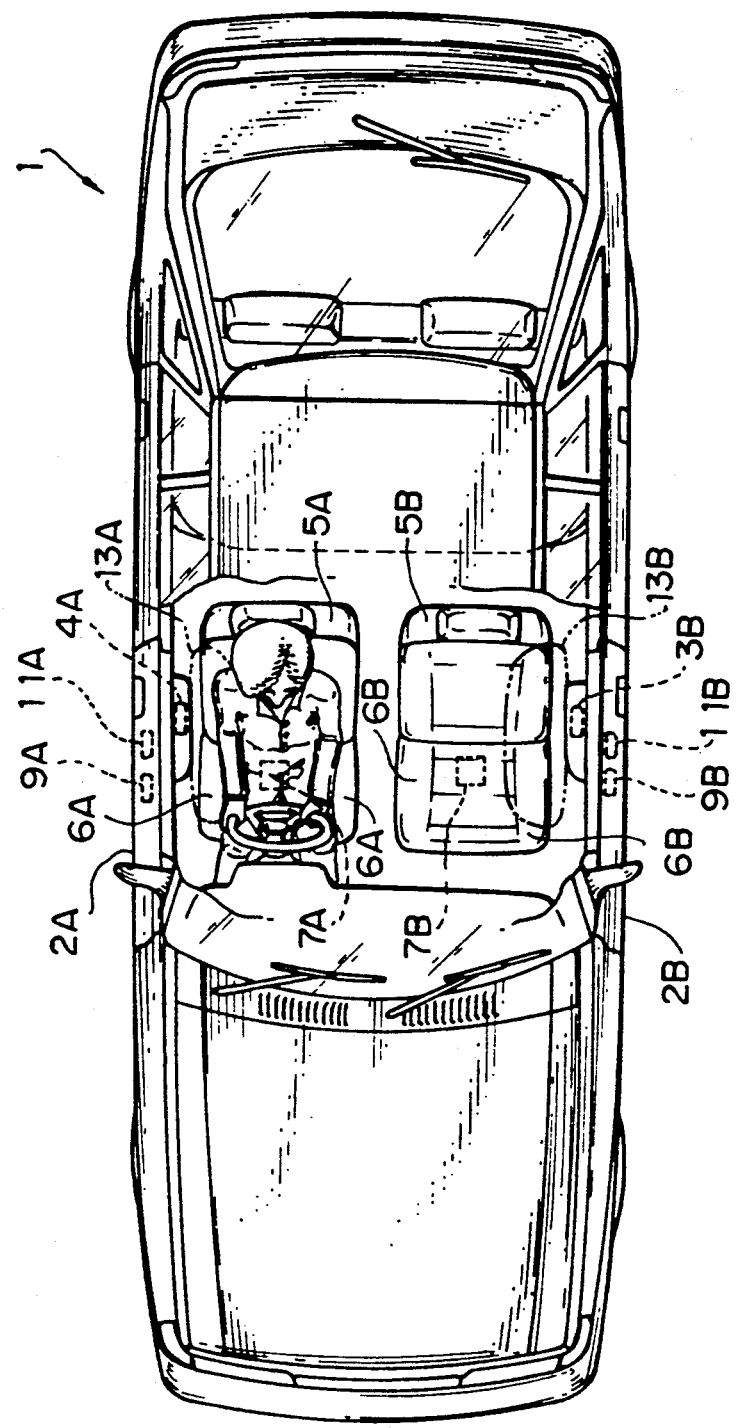
FIG. 2 is a top view showing the internal structure of the vehicle shown in FIG. 1.
Figure 3:
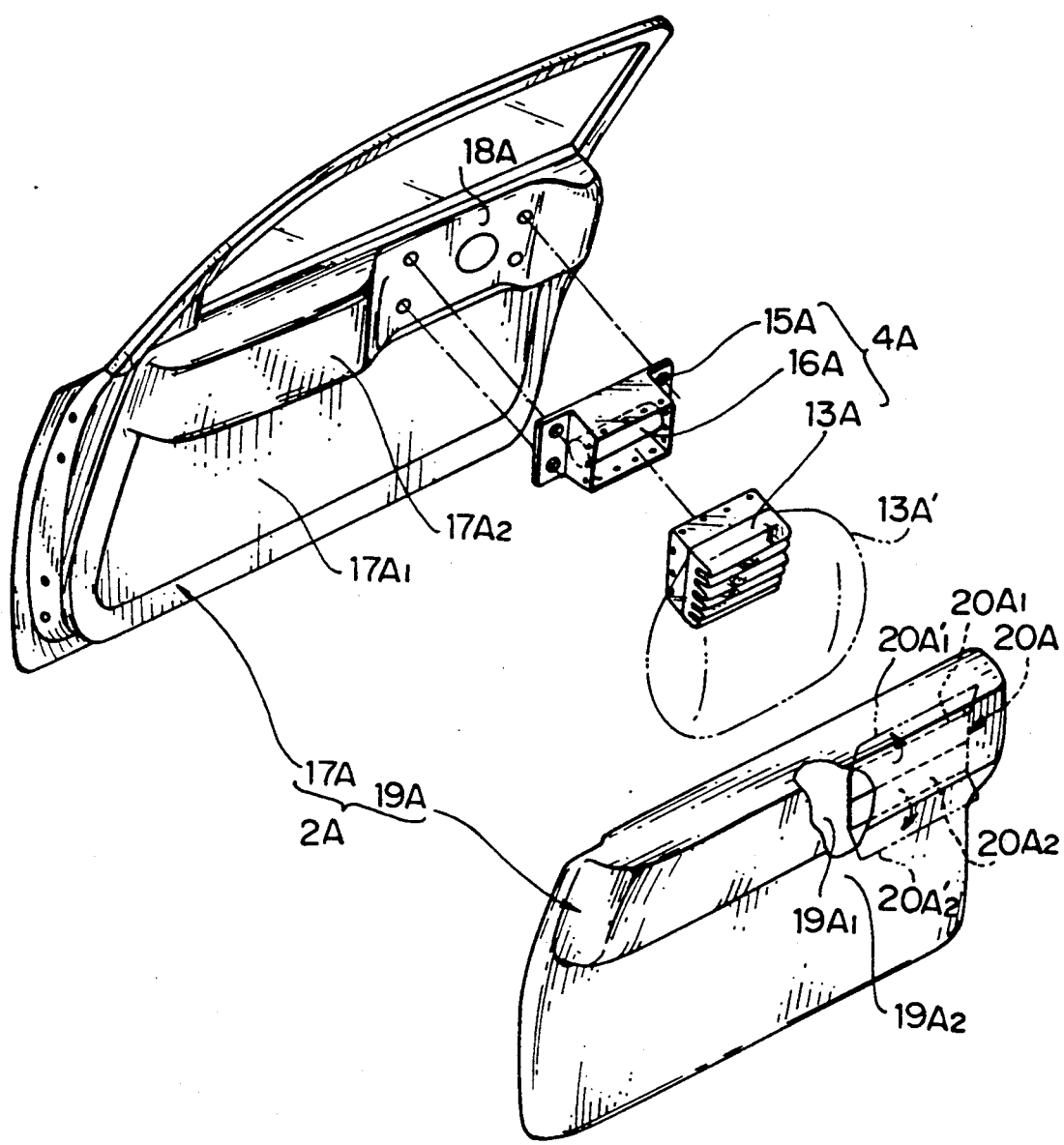
FIG. 3 is an exploded perspective view showing a mounting state of a side-collision unit to a door.

As shown in FIGS. 1 to 3, the side air bag apparatus of the first embodiment comprises a pair of right and left side-collision air bag units (to be referred to as side-collision units hereinafter) 4A and 4B arranged in armrests 3A and 3B of right and left doors 2A and 2B (i.e., the door 2A on the driver's seat side, and the door 2B on the front passenger's seat side), a pair of right and left seat sensors 7A and 7B for detecting on-board states of passengers (including a driver) on seat cushions 6A and 6B arranged in substantially the central portions of right and left front seats 5A and 5B, a pair of right and left first shock sensors 9A and 9B, arranged in the right and left doors 2A and 2B, for detecting side-collision states, a pair of right and left second shock sensors 11A and 11B for detecting side-collision states independently of the first shock sensors 9A and 9B, and a control unit 14 (FIG. 4) for energizing ignition devices 12A and 12B (FIG. 4) of the right and left side-collision units 4A and 4B upon reception of outputs from the shock sensors 9A, 9B, 11A, and 11B in a side-collision state at predetermined timings so as to inflate air bags 13A and 13B of the side-collision units 4A and 4B in a predetermined order.

The structure of the side-collision units 4A and 4B will be described below. Although these side-collision units 4A and 4B are respectively arranged in the right and left doors 2A and 2B, as described above, they have symmetrical structures. Therefore, the structure of the right (driver's seat side) side-collision unit 4A will be described below, and a description of the left (front passenger's seat side) side-collision unit 4B will be omitted.

A detailed structure of the side-collision unit 4A arranged in the door 2A on the driver's seat side of a vehicle will be described below with reference to FIG. 3.

More specifically, the side-collision unit 4A comprises a substantially rectangular box-like module case 15A, which houses an inflator 16A for instantaneously generating a gas upon a reaction between a gas generating agent, and a flammable agent. The inflator 16A includes the ignition device 12A (FIG. 4) which generates heat upon energization to react the gas generating agent and the flammable agent. The air bag 13A is mounted in a folded state on a front surface side of the case 15A to be located above the inflator 16A. The outer peripheral portion of the upper end of the air bag 13A is airtightly fixed to the inner peripheral portion of the top plate of the case 15A, and a plurality of vent holes (not shown) for exhausting a gas are formed near the proximal end portion of the air bag 13A.

When the side-collision unit 4A is mounted in the door 2A, a portion of an armrest portion 17A$_2$ which is formed to project toward an inner panel 17A$_1$ constituting a door sill 17A is recessed to form a side-collision unit mounting portion 18A. The side-collision unit 4A is fastened and fixed to the mounting portion 18A while the air bag 13A faces the interior of the passenger room.

A door trim 19A is mounted on the inner surface of the inner panel 17A$_1$ to cover it. An air bag lid 20A for assuring an unfolding opening of the side-collision unit 4A is formed at a position, corresponding to the side-collision unit 4A, of the door trim 19A. More specifically, a pair of upper and lower lids 20A$_1$ and 20A$_2$ which are respectively vertically openable by H-shaped notched grooves are formed in a trim main body 19A$_1$ of the door trim 19A. Perforations are formed in an outer surface 19A$_2$ of the door trim 19A corresponding to these lids 20A$_1$ and 20A$_2$ in correspondence with the patterns of the lids 20A$_1$ and 20A$_2$.

Since the side-collision unit 4A is mounted in the door 2A in this manner, when the ignitionddevice 12A is energized to cause the gas generating agent and the flammable agent to react each other, a large amount of gas is instantaneously generated from the inflator 16A, and the air bag 13A is unfolded, the notched grooves of the lids 20A$_1$ and 20A$_2$, and the perforations of the outer surface are broken by the unfolding force of the air bag 13A, so that the lids 20A$_1$ and 20A$_2$ are vertically pushed and opened, as indicated by alternate long and short dashed lines with reference numerals 20A$_1$' and 20A$_2$' in FIG. 3, and the air bag 13A is quickly unfolded toward the passenger room, as indicated by reference numeral 13A'.

A reaction rate of the gas generating agent and the flammable agent, the capacity of the air bag 13A, and the opening area of the vent holes are respectively set to be predetermined values, so that the air bag 13A can be fully unfolded after an elapse of about 10 msec from the operation of the ignition device 12A.

The shock sensors 9A and 11A comprise known acceleration sensitive sensors. The first shock sensor 9A is fixed to substantially the central portion of a reinforcement member whose two end portions are coupled to a door outer panel, and which extends in a back-and-forth direction of a vehicle body in the door 2A. The second shock sensor 11A is fixed to substantially the central portion in the back-and-forth direction of a vertical wall portion of a side sill 10A. The first shock sensor 9A is set to have relatively low sensitivity, and is turned on when an impact force in a collision exceeds a predetermined value. The second shock sensor 11A is set to have relatively high sensitivity, and is turned on even by a small impact force. Note that the shock sensors 9A and 11A are turned on after an elapse of about 5 msec from a side collision. Furthermore, the seat sensors 7A and 7B are respectively turned on when passengers sit on the seat cushions 6A and 6B, and are kept OFF when nobody sits on the cushion.

The arrangement and operation of the control unit 14 for inflating the air bags 13A and 13B of the above-mentioned side-collision units 4A and 4B in a predetermined order will be described below with reference to FIG. 4.

Figure 4:
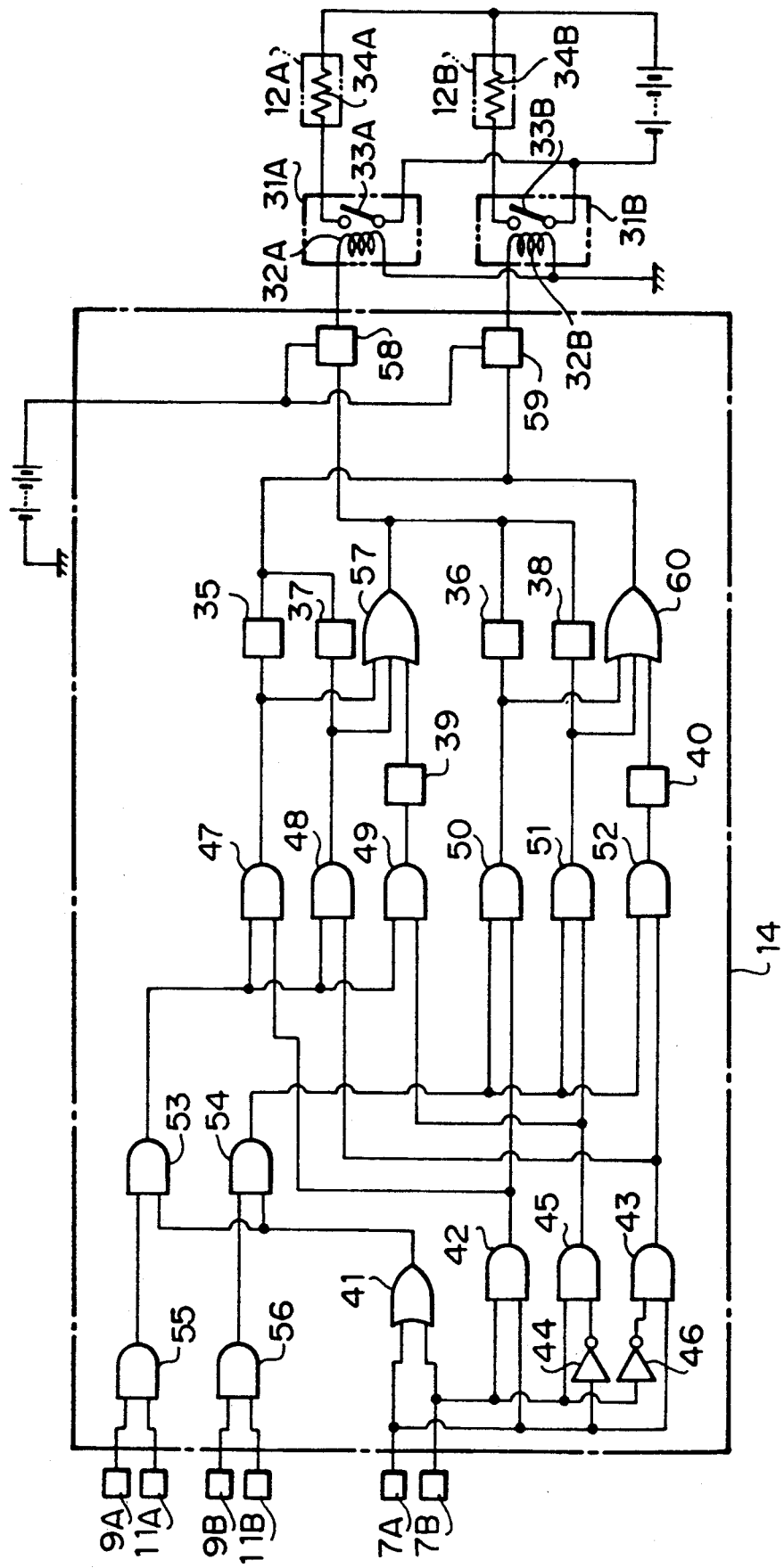
FIG. 4 is a circuit diagram showing a circuit arrangement in a control unit.

As shown in FIG. 4, the control unit 14 comprises two relay switches 31A and 31B for turning on/off the ignition devices 12A and 12B of the side-collision units 4A and 4B on the driver's seat side and on the passenger's seat side, respectively. When solenoids 32A and 32B of the relay switches 31A and 31B are excited to turn on corresponding switches 33A and 33B, heaters 34A and 34B of the ignition devices 12A and 12 corresponding to the ON switches 33A and 33B are energized, thereby inflating and unfolding the corresponding air bags 13A and 13B.

The seat sensor 7A of the driver's seat is connected to an OR gate 41 and AND gates 42 and 43, and is also connected to an AND gate 45 via a NOT gate 44. The seat sensor 7B of the front passenger's seat is connected to the OR gate 41, and the AND gates 42 and 45, and is also connected to the AND gate 43 via a NOT gate 46. The AND gate 42 is connected to AND gates 47 and 50, and the AND gate 43 is connected to AND gates 48 and 52. The AND gate 45 is connected to the AND gates 49 and 51, and the OR gate 41 is connected to AND gates 53 and 54. The shock sensors 9A and 11A on the driver's seat side are connected to the AND gate 53 via an AND gate 55. The shock sensors 9B and 11B on the front passenger's seat side are connected to the AND gate 54 via an AND gate 56. The AND gate 53 is connected to the AND gates 47, 48, and 49, and the AND gate 54 is connected to the AND gates 50, 51, and 52.

Figure 5:
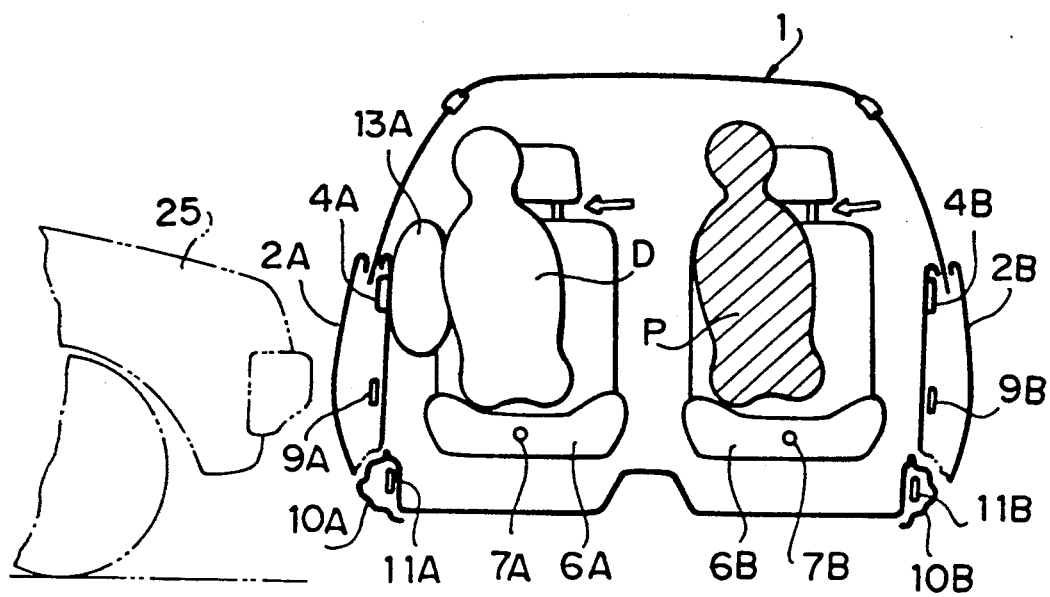
FIG. 5 is a schematic front sectional view showing a moving state of passengers and an unfolded state of air bags immediately after a collision in a side-collision state to a driver's seat side when two persons are on board.

The AND gate 47 is connected to a driving circuit 58 via an OR gate 57, and is also connected to a driving circuit 59 via a first delay circuit 35. In this manner, in a side-collision state to the driver's seat side occurring in a state wherein both a driver D and a passenger P are on board, as shown in FIG. 5, the ignition device 12A on the driver's seat side is operated immediately after the side collision, and the air bag 13A is fully unfolded to receive the driver D immediately before the driver D collides against the door 2A on the driver's seat side. In addition, after an elapse of a delay time T1, the ignition device 12B on the passenger's seat side is operated, and the air bag 13B on the front passenger's seat side is fully unfolded immediately before the passenger P collides against the door 2B on the front passenger's seat side.

Figure 6:
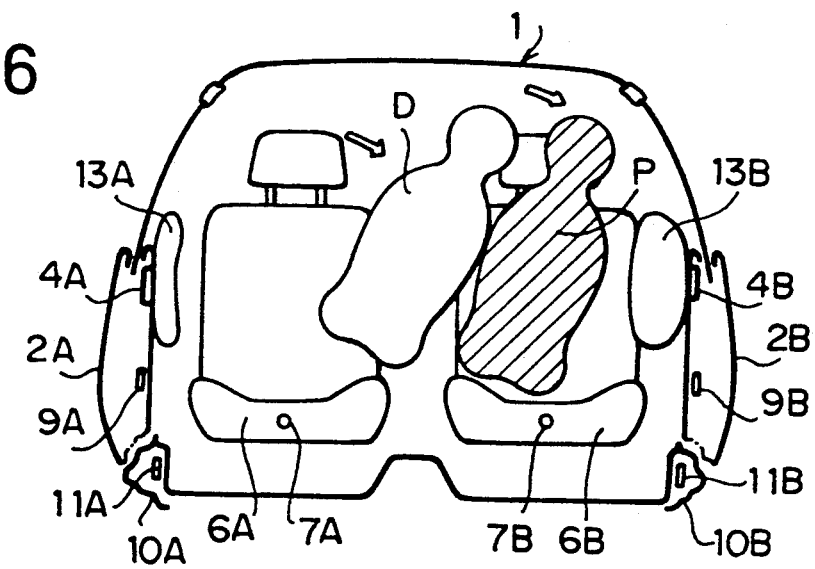
FIG. 6 is a schematic front sectional view showing a moving state of the passengers and an unfolded state of the air bags after an elapse of a delay time T1 from the state shown in FIG. 5.

As a result, in a side-collision state to the driver's seat side, when a side-collision shock is large, the driver D is received by the air bag 13A on the driver's seat side, and is then moved to a side opposite to the collision side (toward the front passenger's seat side). For this reason, after the passenger P is moved to the collision side by the shock in the collision, he or she is then moved to a side opposite to the collision side together with the driver D, as shown in FIG. 6. However, the driver D and the passenger P are reliably received by the fully unfolded air bag 13B on the opposite side.

Figure 7:
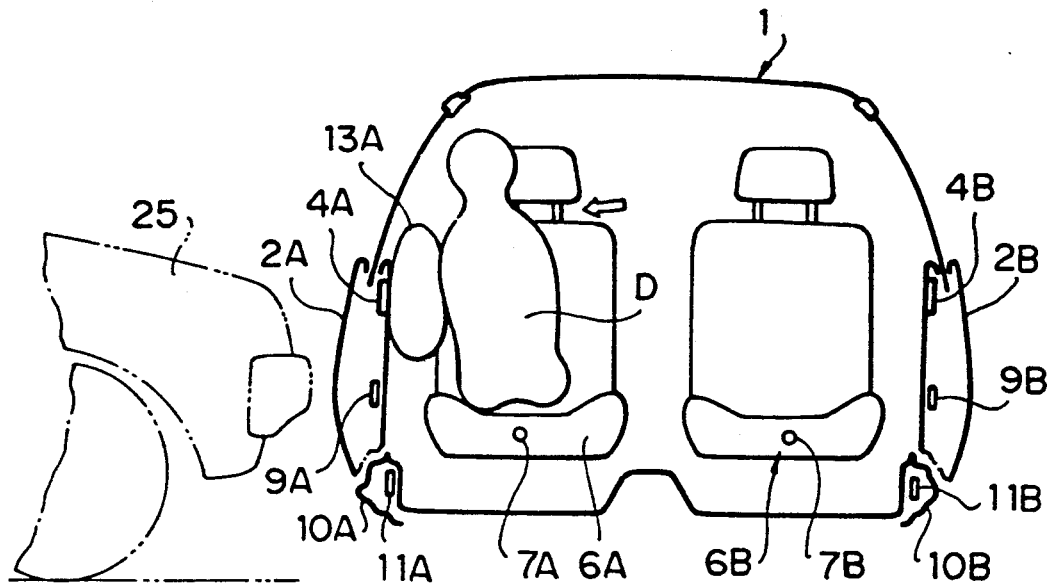
FIG. 7 is a schematic front sectional view showing a moving state of a driver and an unfolded state of the air bag immediately after a collision in a side-collision state to the driver's seat side when only the driver is on board.

The AND gate 48 is connected to the driving circuit 58 via the OR gate 57, and is also connected to the driving circuit 59 via a second delay circuit 37. As shown in FIG. 7, in a side-collision state to the driver's seat side occurring in a state wherein only the driver D is on board, the ignition device 12A is operated immediately after the side collision occurs, and the air bag 13A on the driver's seat side is fully unfolded immediately before the driver D contacts the door 2A. After an elapse of a delay time T2, the ignition device 12 on the front passenger's seat side is operated.

Figure 8:
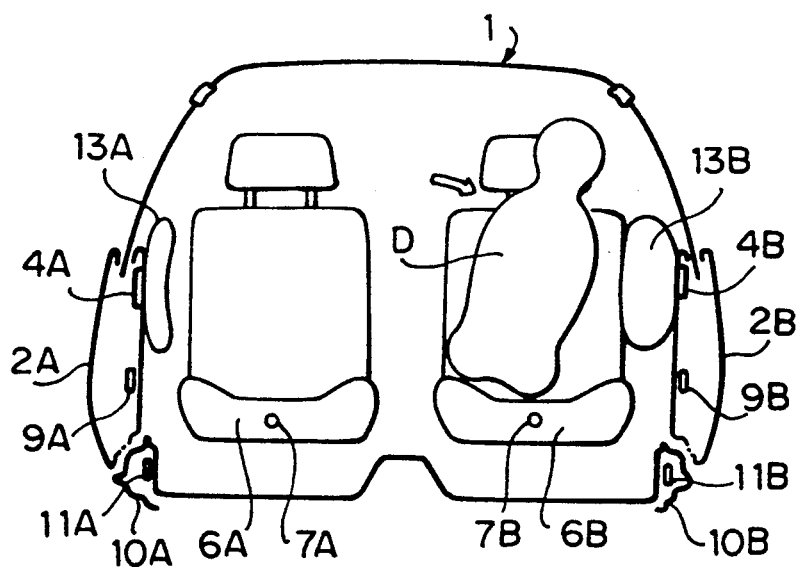
FIG. 8 is a schematic front sectional view showing a moving state of the driver and an unfolded state of the air bag after an elapse of a delay time T2 from the state shown in FIG. 7.

The delay time T2 is set so that the air bag 13B on the front passenger's seat side is fully unfolded immediately before the driver D who is temporarily received by the air bag 13A, and is then moved to the opposite side collides against the door 2B on the front passenger's seat side, as shown in FIG. 8. As a result, in the side-collision state, the driver D is first received by the air bag 13A on the driver's seat side, as shown in FIG. 7. When a collision shock is large, he or she is then moved to the opposite side, and can be reliably received by the fully unfolded air bag 13B, as shown in FIG. 8.

The AND gate 49 is connected to the OR gate 57 via a third delay circuit 39. In this manner, as shown in FIG. 9, in a side-collision state to the driver's seat side occurring in a state wherein only the passenger P is on board, as shown in FIG. 9, the ignition device 12A on the collision side is not immediately operated, but is operated after an elapse of a delay time T3.

Figure 9:
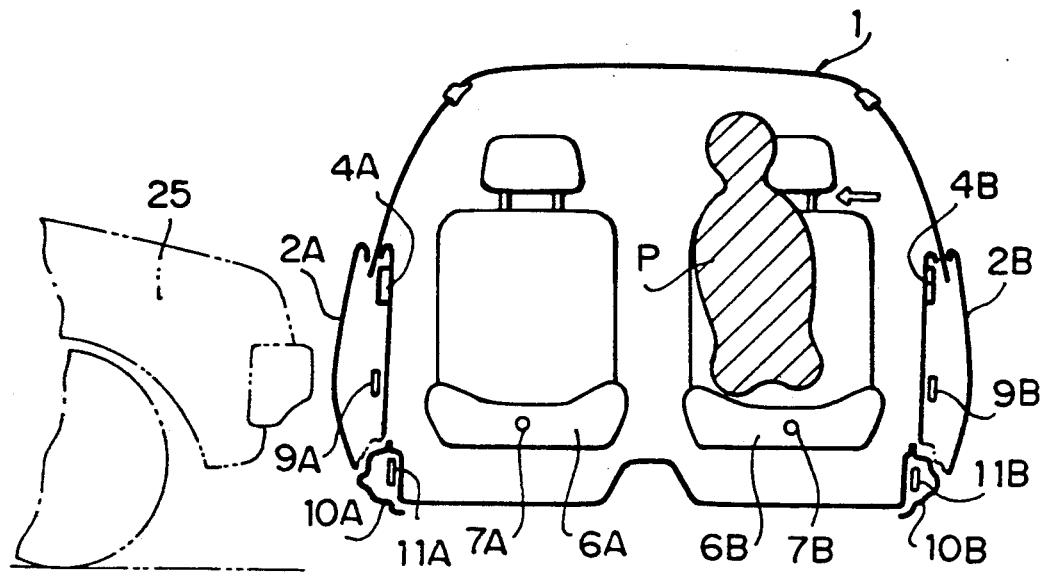
FIG. 9 is a schematic front sectional view showing a moving state of a passenger and an unfolded state of the air bag immediately after a collision in a side-collision state to the driver's seat side when only a passenger is on board.
Figure 10:
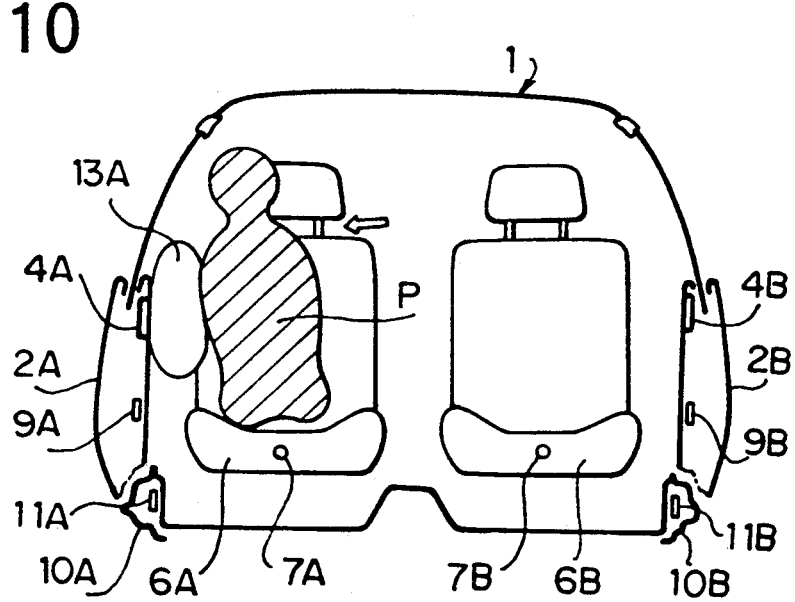
FIG. 10 is a schematic front sectional view showing a moving state of the passenger and an unfolded state of the air bag after an elapse of a delay time T3 from the state shown in FIG. 9.

The delay time T3 is set so that the air bag 13A on the driver's seat side is fully unfolded immediately before the passenger P is moved toward the driver's seat, as shown in FIG. 9, and contacts the door 2A on the driver's seat side, as shown in FIG. 10. As a result, in this side-collision state, the passenger P is moved toward the driver's seat by the collision shock, and can be reliably received by the fully unfolded air bag 13A on the driver's seat side, as shown in FIG. 10.

The AND gate 50 is connected to the driving circuit 59 via an OR gate 60, and is connected to the driving circuit 58 via a fourth delay circuit 36. In this manner, in a side-collision state to the front passenger's seat side occurring in a state wherein both the driver D and the passenger P are on board, the ignition device 12B on the front passenger's seat side is operated immediately after the side collision in contrast to the above-mentioned side collision to the driver's seat side, and the air bag 13B on the front passenger's seat side is fully unfolded immediately before the passenger P contacts the door B. In addition, after an elapse of the delay time T1 which is set in the same manner as that in the first delay circuit 35, the ignition device 12A on the driver's seat side is operated, so that the air bag 13A on the driver's seat side is fully unfolded immediately before the driver D contacts the door 2A.

The AND gate 51 is connected to the driving circuit 59 via the OR gate 60, and is also connected to the driving circuit 58 via a fifth delay circuit 38. In this manner, in a side-collision state to the front passenger's seat side occurring in a state wherein only the passenger P is on board, in contrast to the above-mentioned side collision to the driver's seat side, the ignition device 12B on the front passenger's seat side is operated immediately after the side collision, and the air bag 13B on the front passenger's seat side is fully unfolded immediately before the passenger P contacts the door 2B. After an elapse of the delay time T2 which is set in the same manner as that in the second delay circuit 37, the ignition device 12A is operated, and the air bag 13A on the driver's seat side is fully unfolded immediately before the passenger P contacts the door 2A.

Furthermore, the AND gate 52 is connected to the OR gate 60 via a sixth delay circuit 40. In this manner, in a side-collision state to the front passenger's seat side occurring in a state wherein only the driver D is on board, in contrast to the above-mentioned side collision to the driver's seat side, after an elapse of the delay time T3 which is set in the same manner as that set in the third delay circuit 39, the ignition device 12B on the front passenger's seat side is operated, so that the air bag 13B on the front passenger's seat side is fully unfolded immediately before the driver D contacts the door 2B.

In a side-collision state without passengers, neither of the right and left air bags 13A and 13B are unfolded.

Setting conditions for the delay times T1 to T3 for optimally setting energization timings to the heaters 34A and 34B in accordance with on-board conditions of passengers will be explained below.

The delay time T1 is a delay time corresponding to a case wherein passengers sit at the side-collision side, and the opposite side, respectively. In this case, the delay time T1 is set to be a time (e.g., T1=340 msec) required for a passenger, who sits at a side opposite to the collision side, to temporarily move toward the collision side, and then move toward the door opposite to the side-collision side by swing back of a passenger on the collision side.

The delay time T2 is a delay time corresponding to a case wherein a passenger sits at only the side-collision side. In this case, the time T2 is set to be a time (e.g., T2=180 msec) required for the passenger to move toward the door opposite to the side-collision side after he or she is temporarily received by the air bag unfolded on the collision side. Furthermore, the delay time T3 is a delay time corresponding to a case wherein a passenger sits at only a side opposite to the side-collision side. In this case, the time T3 is set to be a time (e.g., T3=130 msec) required for the passenger, who sits at the side opposite to the collision side, to move toward the door on the collision side after the collision.

As a result, in the first embodiment, paying attention to movement of passengers in the side-collision state, the unfolding timings of the air bag 13A of the right side-collision unit 4A arranged in the right door 2A, and the air bag 13B of the left side-collision unit 4B arranged in the left door 2B are shifted by appropriately setting the delay times T1 to T3 in accordance with the collision modes. More specifically, the unfolding timing of the air bag opposite to the collision side is delayed by a predetermined period of time from the unfolding timing of the air bag on the collision side. For example, in the first embodiment, after an elapse of about 10 msec from when the shock sensor on the collision side detects occurrence of the side collision, the air bag on the collision side is unfolded. In this case, the air bag on the side opposite to the collision side is unfolded after an elapse of 100 to 300 msec from the detection timing, e.g., after an elapse of 160 msec in the first embodiment.

Note that the air bag on the side opposite to the collision side is unfolded after an elapse of the delay time T1 or T2 for the following reasons. More specifically, assuming a side collision from the driver's seat side occurring when only the driver D is on board, as shown in, e.g., FIGS. 7 and 8, when a vehicle 25 collides against the right door 2A portion, the driver D temporarily falls sideways toward the right door 2A side by the inertia of the collision, as shown in FIG. 7, and is then thrown toward the left door 2B side by a counterforce, as shown in FIG. 8. For this reason, a timing at which the driver D collides against the right door 2A side and a timing at which he or she collides against the left door 2B side inevitably have a difference. Thus, the air bag 13A of the right side-collision unit 4A on the right door 2A side, and the air bag 13B of the left side-collision unit 4B on the left door 2B side must reliably constrain the passenger in an optimal unfolded state, and protect him or her. The present inventors repetitively conducted tests in correspondence with various cases (e.g., on-board states of passengers, side-collision directions, and the like), and set the above-mentioned delay times on the basis of the following theoretical analysis as well as these test results.

Figure 11:
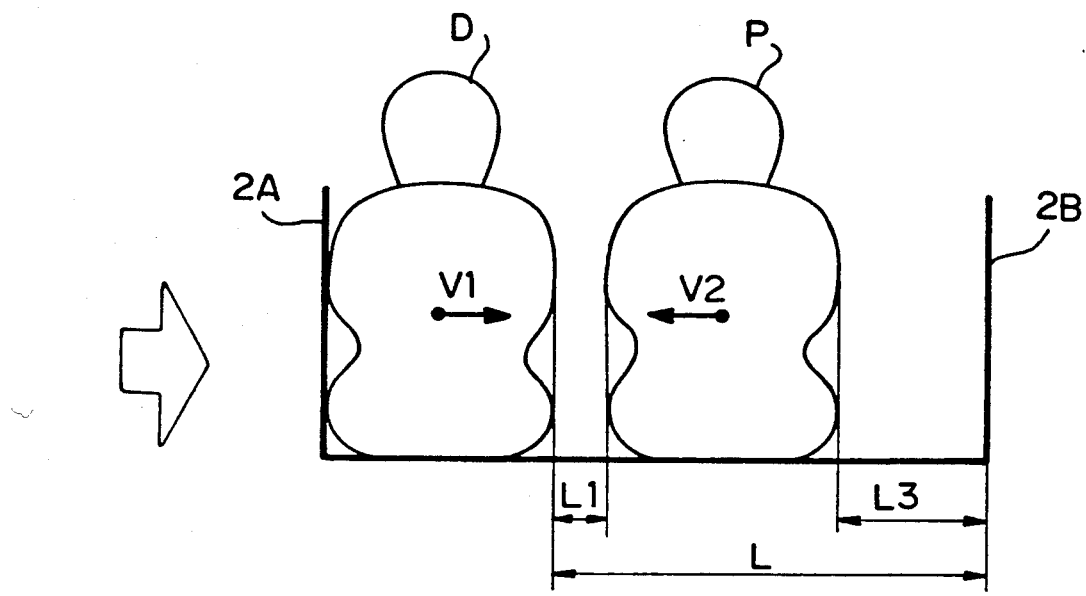
FIG. 11 is a view for explaining a logic calculation sequence of a first delay time for delaying an unfolding timing of the air bag on a front passenger's seat side opposite to a collision side in a side collision to a door on the driver's seat side when two persons are on board.
Figure 12:
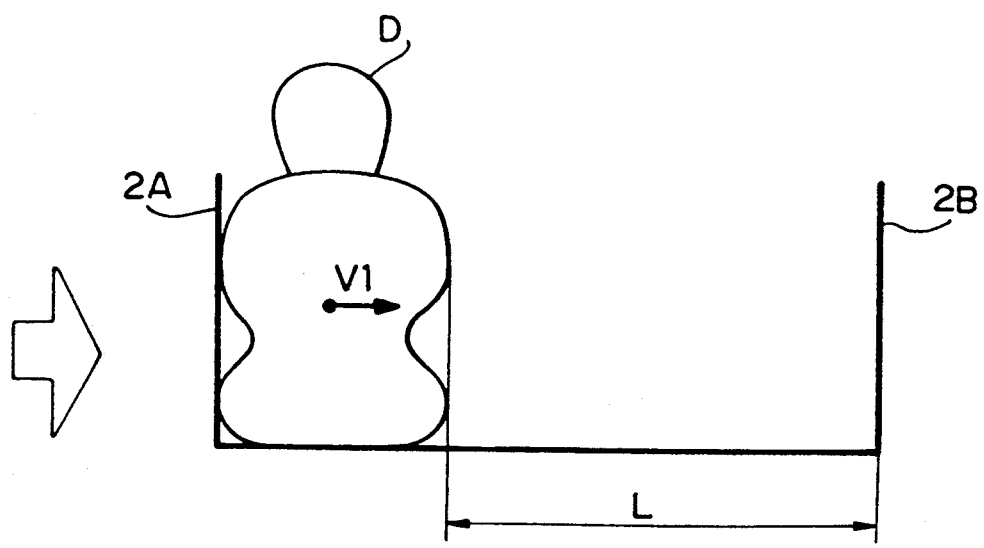
FIG. 12 is a view for explaining a logic calculation procedure of a second delay time for delaying an unfolding timing of the air bag on the front passenger's seat side opposite to a collision side in a side collision to a door on the driver's seat side when only a driver is on board.

In order to set the above-mentioned first and second delay times T1 and T2, calculations based on FIGS. 11 and 12 will be briefly described below. FIGS. 11 and 12 illustrate states at an instance when a passenger collides against the door 2A on the side-collision side.

In FIG. 11, in a side-collision state to the door 2A on the driver's seat 5A side, a time t1 until the driver D and the passenger P contact each other is given by:

$$t1 = L1/(V1+V2) \quad (1)$$

If velocities of the two persons D and P after the collision are represented by v1 and v2 (a counter-collision direction is positive), and the weights of the two persons D and P are equal to each other, from the momentum conservation law, we have:

$$V1 - V2 = v1 + v2 \quad (2)$$

If a coefficient of restitution of the two persons D and P is represented by $\alpha$, the coefficient $\alpha$ is given by:

$$\alpha = -(v2-v1)/(-V2-V1) \quad (3)$$

From equations (2) and (3), $$v2 = [V1(1+\alpha) - V2(1-\alpha)]/2$$

Therefore, a time T1 until the passenger P contacts the door 2B on the side opposite to the collision side is given by:

$$\begin{aligned} T1 &= t1 + (L3 + V2 \times t1)/v2 \\ &= [L1(1+\alpha) + 2L3]/[V1(1+\alpha) - V2(1-\alpha)] \end{aligned}$$

On the other hand, in FIG. 12, when there is no passenger P on the front passenger's seat 5B, a time T2 until the driver D is thrown toward the door 2B on the side opposite to the collision side by a counterforce of the side collision to the door 2A on the driver's seat 5A side, and contacts the door 2B on the side opposite to the collision side is given by:

$$T2 = L/V1$$

If V1=V2=5 m/sec, L1=141 mm, L3=230 mm, L=783 mm, and the coefficient $\alpha$ of restitution of the two passengers=0.2, T1=314.6 msec, and T2=159.2 msec can be obtained.

The operation of the air bag apparatus with the above-mentioned arrangement will be described below.

When passengers sit at the side-collision side and on the side opposite thereto (assume that a collision occurs on the driver's seat 5A side for the sake of descriptive simplicity), the air bag 13A on the collision side is immediately fully unfolded (after an elapse of about 15 msec after the collision), and the passenger D on the collision side is received by the fully unfolded air bag 13A, thereby preventing a secondary collision between the passenger D on the collision side and the door 2A. After an elapse of the first delay time T1 from when the air bag 13A is fully unfolded, the air bag 13B on the side opposite to the collision side is fully unfolded. As a result, even when the passenger D on the collision side is thrown toward the opposite side by the shock from the door 2A on the collision side, and is then moved toward the opposite side together with the other passenger P, the air bag 13B on the opposite side, which bag is fully unfolded after a given delay time can effectively prevent a tertiary collision between the passenger P and the door 2B.

When only the passenger D on the side-collision side is on board, the air bag 13A on the collision side is fully unfolded (after an elapse of about 15 msec after the collision), and the passenger D is received by the fully unfolded air bag 13A, thereby preventing a secondary collision between the passenger D on the collision side and the door 2A. After an elapse of the second delay time T2 from when the air bag 13A is fully unfolded, the air bag 13B on the side opposite to the collision side is fully unfolded. As a result, even when the passenger D is thrown toward the opposite side by the shock from the door 2A entering the passenger room, a tertiary collision between the passenger D and the door 2B can be effectively prevented by the fully unfolded air bag 13B on the opposite side.

When the passenger P sits at only the side opposite to the side-collision side, the air bag 13A on the collision side is unfolded after an elapse of the third delay time T3, and even when the passenger P is thrown toward the collision side by the inertia, a secondary collision between the passenger P and the door 2A can be effectively prevented by the fully unfolded air bag 13A on the collision side.

As described above, since the unfolding timings of the air bags 13A and 13B are changed in accordance with the on-board conditions of passengers, the air bags 13A and 13B can be properly fully unfolded immediately before the passengers D and P contact the doors 2A and 2B, so that the passengers D and P can be received by the fully unfolded air bags 13A and 13B, thereby preventing second and tertiary collisions between the passengers D and P and the doors 2A and 2B.

The present invention is not limited to the arrangement of the first embodiment, and various changes and modifications may be made within the spirit and scope of the invention.

For example, in the first embodiment, the collision units 4A and 4B are arranged in the armrests 3A and 3B of the doors 2A and 2B. Alternatively, the collision units 4A and 4B may be arranged to extend over the door-side portions of the seat cushions 6A and 6B of the seats 5A and 5B, and the door-side portions of seat backs.

In the first embodiment, an air bag unit 4 for generating a gas by reacting a gas generating agent and a flammable agent is adopted. However, the present invention may be similarly applied to a vehicle comprising an air bag unit for generating a gas by other methods.

In addition, the same side-collision units may also be arranged in two doors on two sides of rear seats, first and second shock sensors may be arranged in these doors and side sills, and the same air bag unfolding control as described above may be executed.

In the first embodiment, the side-collision units 4A and 4B are arranged in the right and left doors 2A and 2B. However, the present invention is not limited to this. For example, the side-collision units may be arranged in the door portions, and roof rail portions located above the door portions. More specifically, since a bumper of a vehicle is normally located at the level of a waist portion of a passenger sitting on the seat, he or she receives a shock on his or her waist portion in a side collision of the vehicle, and thereafter, when his upper body falls down by the inertia, his shoulder or head portion collides against the upper portion in the passenger room. Therefore, in this case, like in the above embodiment, the unfolding timing of an upper air bag is delayed from that of a lower air bag, so that both the waist and shoulder portions of a passenger can be constrained by the air bags in the optimal unfolded state, thus improving the protection performance.

In addition, the unfolding timing of the air bag may be delayed as the position of a passenger is farther from a collision portion, or may be delayed as the collision direction of another vehicle with respect to a vehicle side portion is offset in a forward or backward direction from the sideway direction. In the former case, as the position of the passenger is farther from the collision portion, a shock transmission timing to the passenger is delayed, and in the latter case, a shock transmission timing to the passenger is advanced as a collision angle comes closer to a sideway state.

In the first embodiment described above, the first and second shock sensors as side-collision sensors comprise known acceleration sensitive sensors. However, the present invention is not limited to this. For example, any other sensors may be employed as long as they can detect a collision state.

Various embodiments of the present invention other than the first embodiment will be described hereinafter.

Second Embodiment

In the first embodiment described above, the air bags 13A and 13B are unfolded from the side surfaces of the armrests 3A and 3B mounted on the corresponding doors 2A and 2B. However, the present invention is not limited to this arrangement. As shown in FIGS. 13 to 16 as the second embodiment, the air bags 13A and 13B may be unfolded from the upper surfaces of the armrests 3A and 3B toward the passenger room.

The structure of the second embodiment of the present invention will be described below with reference to FIGS. 13 to 16. The same reference numerals in this embodiment denote the same parts as in the first embodiment described above, and a detailed description thereof will be omitted.

Figure 13:
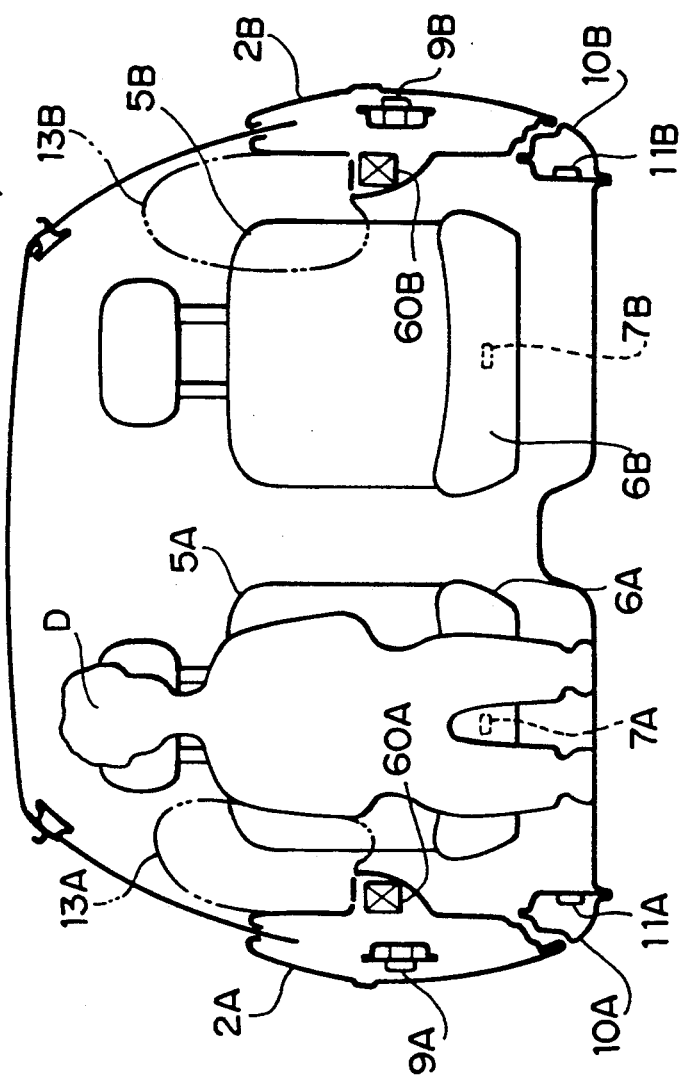
FIG. 13 is a schematic front view showing an unfolded state of an air bag in an energy absorbing structure for a vehicle body side portion according to the second embodiment of the present invention.

As shown in FIG. 13, in the second embodiment, side-collision units 60A and 60B are unfolded from the upper surfaces of armrests 3A and 3B where they are stored toward the passenger room, more specifically, toward shoulder portions of corresponding passengers. The structure of the side-collision units 60A and 60B of the second embodiment will be described in detail below. Like in the first embodiment, since the two side-collision units 60A and 60B have symmetrical structures, only the structure of the right side-collision unit 60A on a driver's seat 5A side will be described below, and a description of the structure of the left side-collision unit 60B on a front passenger's seat 5B side will be omitted.

Figure 14:
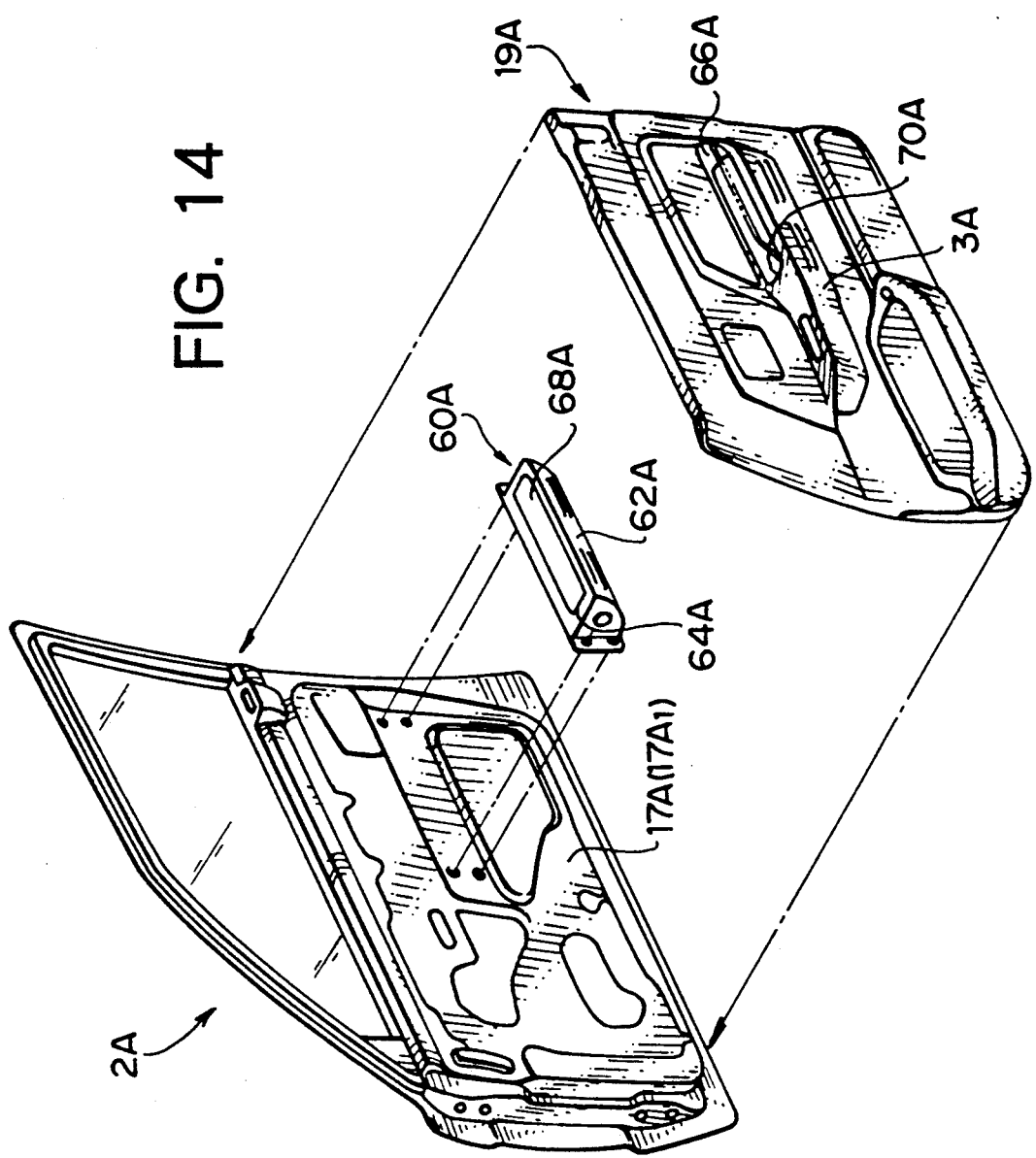
FIG. 14 is an exploded perspective view showing a structure of a door in which a side-collision unit for achieving the unfolded state of the air bag shown in FIG. 13 is mounted.
Figure 15:
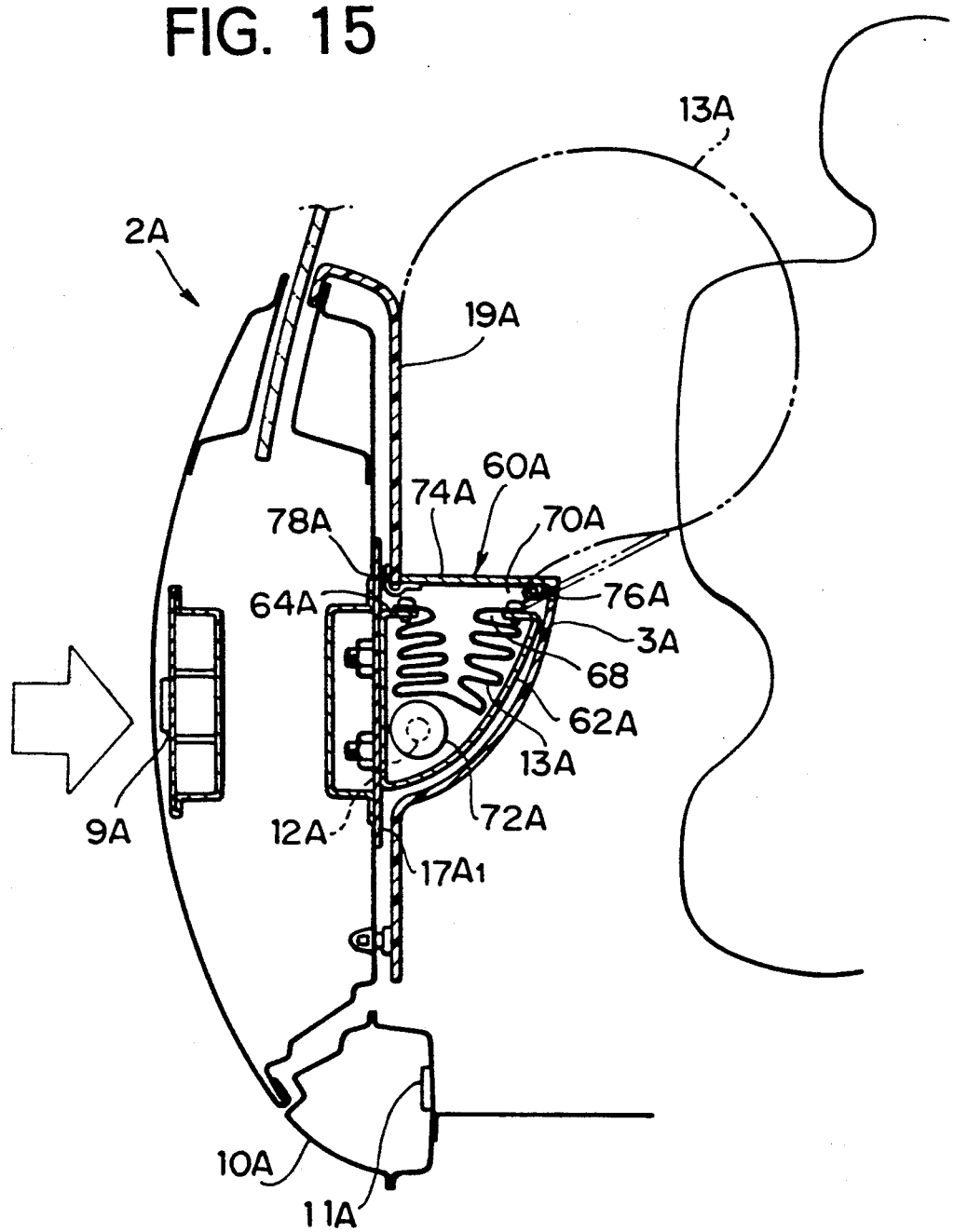
FIG. 15 is a cross-sectional view showing the structure of the side-collision unit according to the second embodiment for unfolding the air bag, as shown in FIG. 13.
Figure 16:
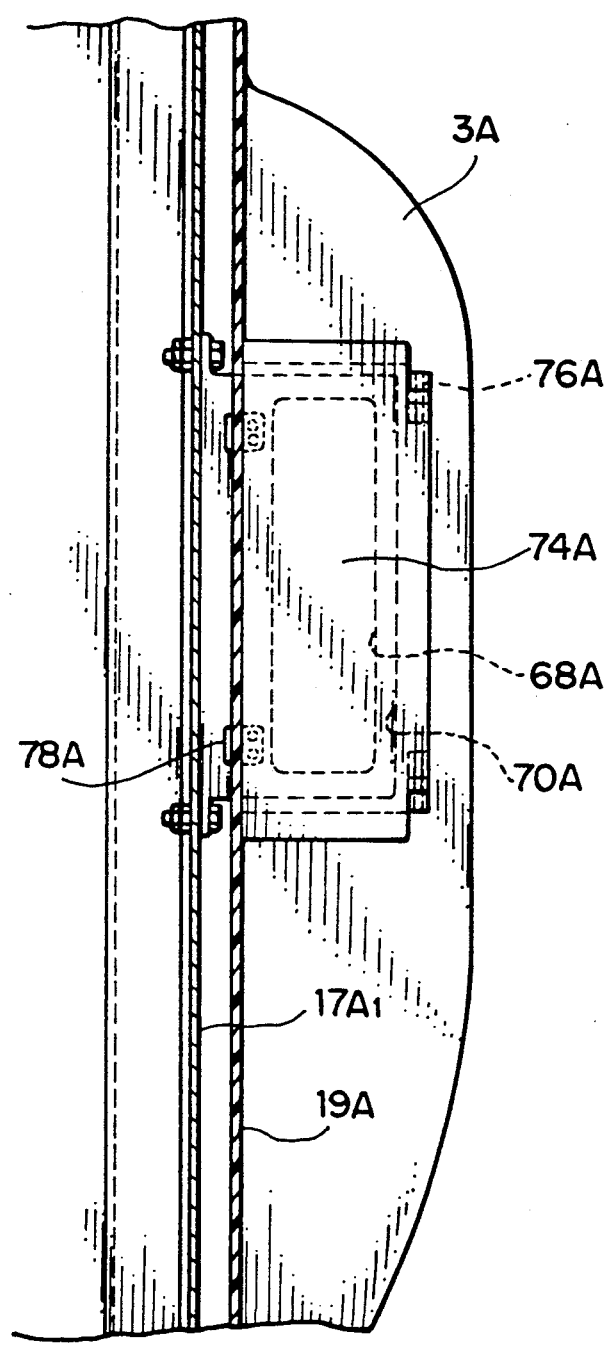
FIG. 16 is a cross-sectional view showing a mounting state of the side-collision unit shown in FIG. 15 in an armrest.
Figure 17:
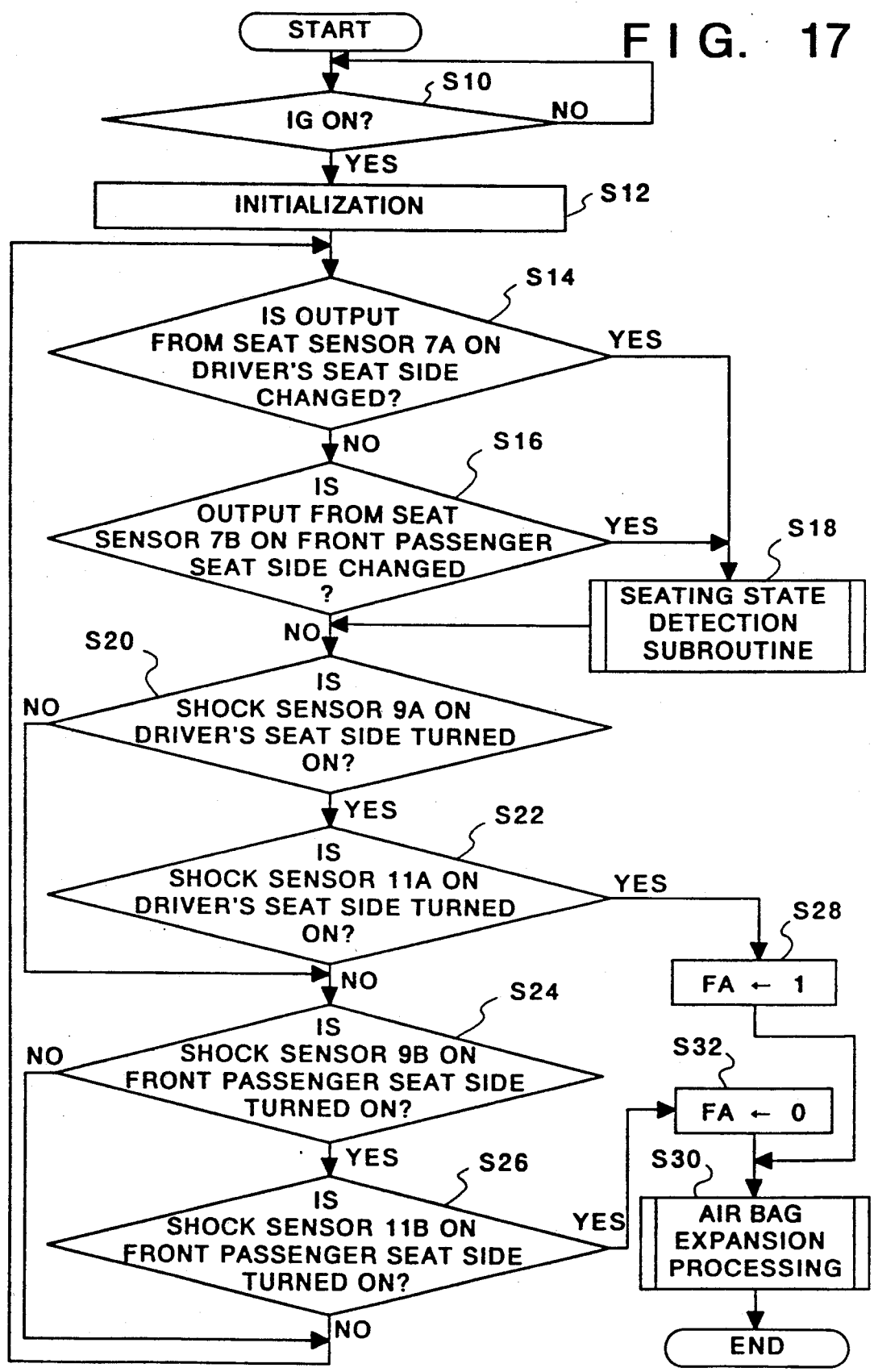
FIG. 17 is a flow chart showing an air bag unfolding control sequence in a control unit in an energy absorbing structure for a vehicle body side portion according to the third embodiment of the present invention.

More specifically, as shown in FIGS. 14 to 16, the armrest 3A is formed on a substantially middle portion of a door trim 19A of a right door 2A to project into the passenger room. The armrest 3A houses a module case 62A, as shown in FIG. 14. The outer end face of the module case 62A is fixed to a door inner panel 17A$_1$. Substantially rectangular opening portions 68A and 70A are respectively formed in a top plate 64A of the module case 62A, and an upper wall portion 66a of the armrest 3A. A gas generator 72A for instantaneously generating a gas upon a reaction of a gas generating agent and a flammable agent is housed in a lower portion of the module case 62A, as shown in FIG. 15. The gas generator 72A includes an ignition device 12A for generating heat upon energization to react the gas generating agent and the flammable agent. A bag-like air bag 13A is housed above the gas generator 72A in a folded state.

The outer peripheral portion of the upper end of the air bag 13A is airtightly fixed to the inner edge portion of the top plate 64A. A plurality of vent holes (not shown) for exhausting the gas in the air bag 13A are formed near the proximal end portion of the air bag 13A. A lid member 74A for closing the opening portion 70A is openably arranged on the armrest 3A via a pair of hinge members 76A and a pair of leaf springs 78A.

In this manner, in the second embodiment, when the ignition device 12A is energized, the gas generating agent and the flammable agent react each other, and a large amount of gas is instantaneously generated from the gas generator 72A. The air bag 13A pivots the lid member 74A about the hinge members 76A against the biasing forces of the leaf springs 78A to open the opening portion 70A, and is inflated and extended from the upper surface of the armrest 3A between a passenger D and the door 2A.

A reaction rate of the gas generating agent and the flammable agent, the capacity of the air bag 13A, and the opening area of the vent holes are respectively set to be predetermined values, so that the air bag 13A can be fully unfolded after an elapse of about 10 msec from the operation of the ignition device 12A like in the first embodiment.

With the structure of the second embodiment as described above, the same effects as in the first embodiment can be provided.

Third Embodiment

In the first embodiment described above, control for shifting the unfolding timing of the air bag 13A of the right side-collision unit 4A arranged in the right door 2A, and that of the left side-collision unit 4B arranged in the left door 2B by a predetermined period of time in consideration of movement of passengers in the side-collision state is achieved by a hardware arrangement (circuit arrangement) in the control unit 14 shown in FIG. 4. However, the present invention is not limited to this arrangement. For example, as shown in FIGS. 17 to 20 as the third embodiment, a control sequence by software programmed in a microcomputer or a programmable controller may be executed.

A software control sequence in the control unit 14 as the third embodiment will be described below with reference to FIGS. 17 to 20.

When an ignition switch IG is turned on, as shown in step S10, the unfolding control operations of the air bags 13A and 13B are started. In step S12, data are initialized. In step S12, after the data are initialized, on-board state detection processing (to be described later) is executed. Thus, an on-board state when the IG switch is turned on is detected, and data indicating the on-board state is saved in a flag memory (not shown). Thereafter, only when an on-board state is changed in steps S14 and S16, an on-board state detection operation in step S18 is executed, data indicating the changed on-board state is saved in the flag memory, and the storage content of the flag memory is updated. If the on-board state is left unchanged, the control skips step S18. The on-board state detection processing in step S18 will be described in detail later as a subroutine.

It is checked in step S14 if the output from the seat sensor 7A on the driver's seat 5A side is changed. If YES in step S14, the flow jumps to step S18. On the other hand, if NO in step S14, the flow advances to step S16 to check if the output from the seat sensor 7B on the front passenger's seat 5B side is changed. If YES in step S16, the flow advances to step S18; otherwise, the flow advances to step S20.

In steps S20 to S26, side-collision detection processing, i.e., detection processing for detecting whether a side collision occurred on the driver's seat 5A side or the front passenger's seat 5B side is executed. In steps S20 and S22, whether or not a side collision occurred on the driver's seat 5A side is checked. In steps S24 and S26, whether or not a side collision occurred on the front passenger's seat 5B side is checked.

More specifically, it is checked in step S20 if the first shock sensor 9A on the driver's seat 5A side is turned on. If YES in step S20, it is then checked in step S22 if the second shock sensor 11A on the driver's seat 5A side is turned on. If YES in step S22, since it is determined that both the first and second shock sensors 9A and 11A on the driver's seat 5A side are turned on, "1" is set in a flag FA indicating that a side collision to the driver's seat 5A side occurred in step S28, and the flow advances to air bag unfolding processing in step S30. Note that the air bag unfolding processing in step S30 will be described in detail later as a subroutine. On the other hand, if NO in step S20, the flow skips step S22, and jumps to step S24. If NO in step S22, the flow also advances to step S24.

In step S24, it is checked if the first shock sensor 9B on the front passenger's seat 5B side is turned on. If YES in step S24, it is then checked in step S26 if the second shock sensor 11B on the front passenger's seat 5B side is turned on. If YES in step S26, since it is determined that both the first and second shock sensors 9B and 11B on the front passenger's seat 5B side are turned on, "0" is set in the flag FA in step S32 to indicate that a side collision to the front passenger's seat 5B occurred. The flow then advances to the air bag unfolding processing in step S30. On the other hand, if NO in step S24, the flow skips step S26, and returns to step S14. In addition, if NO in step S26, the flow also returns to step S14.

Figure 18:
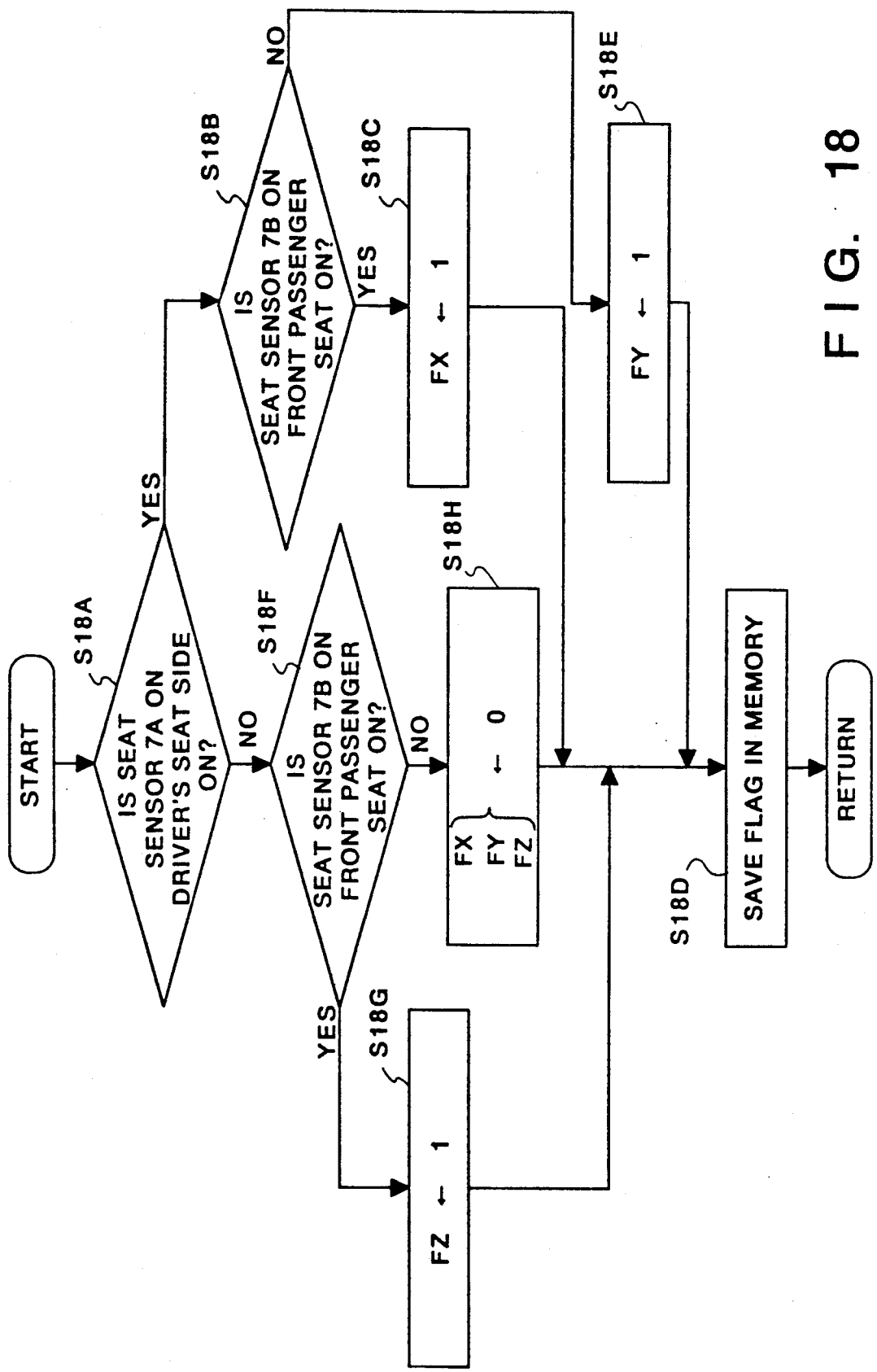
FIG. 18 is a flow chart showing in detail, as a one, a control sequence of on-board state detection processing shown in FIG. 17.

Upon completion of the air bag unfolding processing in step S30, since the side-collision units 4A and 4B cannot be reused as they are, the control sequence of the unfolding control operation is ended The on-board state detection processing in step S18 will be described below as a subroutine with reference to FIG. 18.

As described above, if YES in step S14 or S16, the on-board state detection processing in step S18 is started. In step S18A, it is checked if the seat sensor 7A on the driver's seat 5A side is turned on. If YES in step S18A, it is checked in step S18B if the seat sensor 7B on the front passenger's seat 5B side is turned on. If YES in step S18B, i.e., if it is determined that both the seat sensors 7A and 7B are turned on, since this means that passengers sit on both the driver's seat 5A and the front passenger's seat 5B, "1" is set in a flag FX indicating that both the driver D and the passenger P are on board in step S18C. Thereafter, in step S18D, the flag FX set with "1" is saved in the memory to update the memory content, and the flow returns to the main routine.

On the other hand, if NO in step S18B, i.e., if it is determined that only the seat sensor 7A on the driver's seat 5A side is turned on, since this means that a passenger sits on only the driver's seat 5A, "1" is set in a flag FY indicating that only the driver D is on board in step S18E. Thereafter, the flow advances to step S18D, and the flag FY set with "1" is saved in the memory to update the memory content. The flow then returns to the main routine.

If NO in step S18A, it is checked in step S18F if the seat sensor 7B on the front passenger's seat 5B side is turned on. If YES in step S18F, i.e., if it is determined that only the seat sensor 7B on the front passenger's seat 5B side is turned on, since this means that a passenger sits on only the front passenger's seat 5B, "1" is set in a flag FZ indicating that only the passenger P is on board in step S18G. Thereafter, the flow advances to step S18D, and the flag FZ set with "1" is saved in the memory to update the memory content. The flow then returns to the main routine.

If NO in step S18F, i.e., if both the seat sensors 7A and 7B on the driver's seat 5A side and the front passenger's seat 5B side are turned off, since this means that nobody sits on the front seats, the above-mentioned three flags FX, FY, and FZ are reset to "0", and the flow advances to step S18D. In step S18D, the flags FX, FY, and FZ set with "0" are saved in the memory to update the memory content, and the flow returns to the main routine.

In this manner, the control sequence of a series of on-board state detection processing in step S18 is ended.

Figure 19:
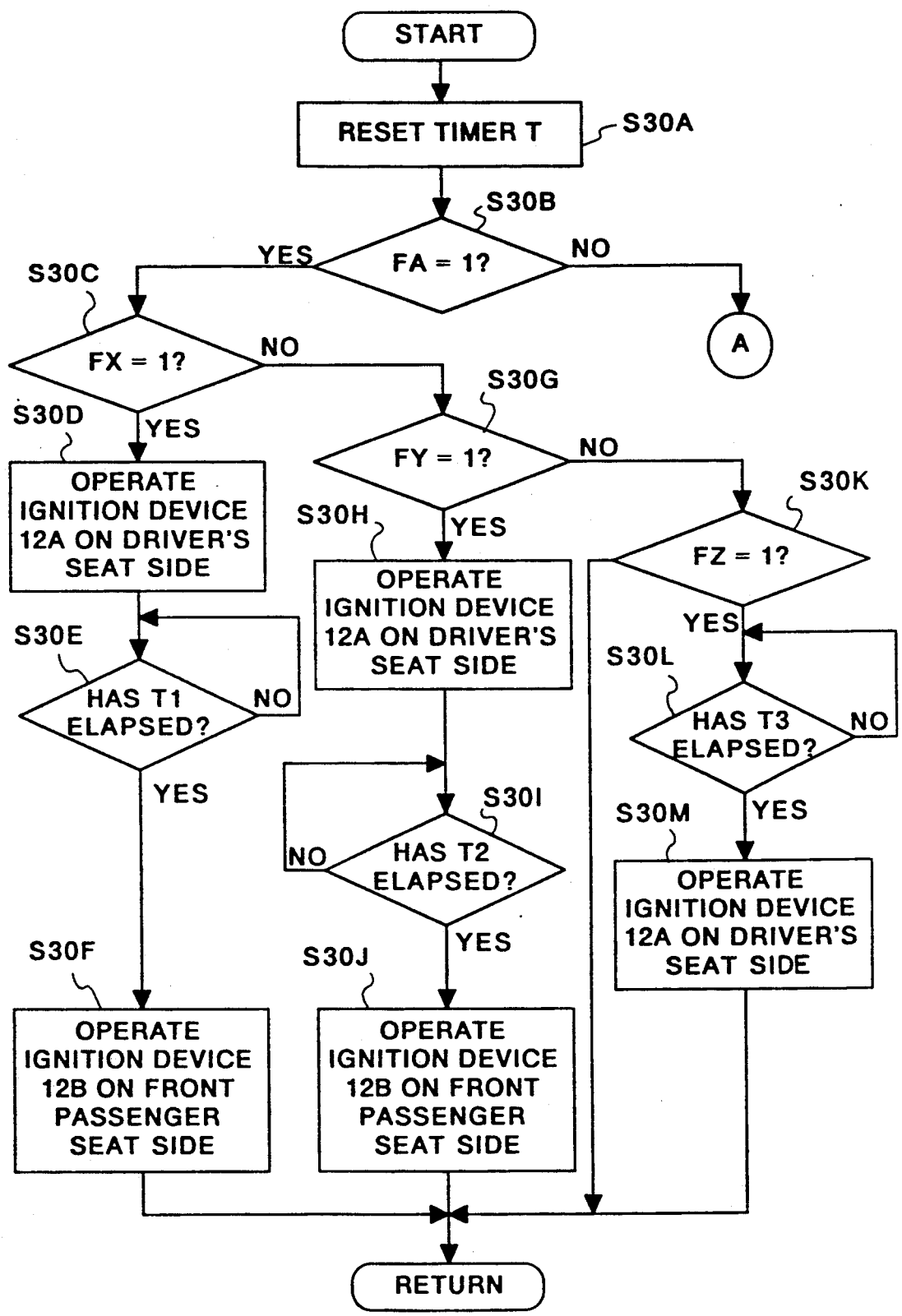
FIGS. 19 and 20 are flow charts showing in detail, as subroutines, a control sequence of air bag unfolding processing shown in FIG. 17.
Figure 20:
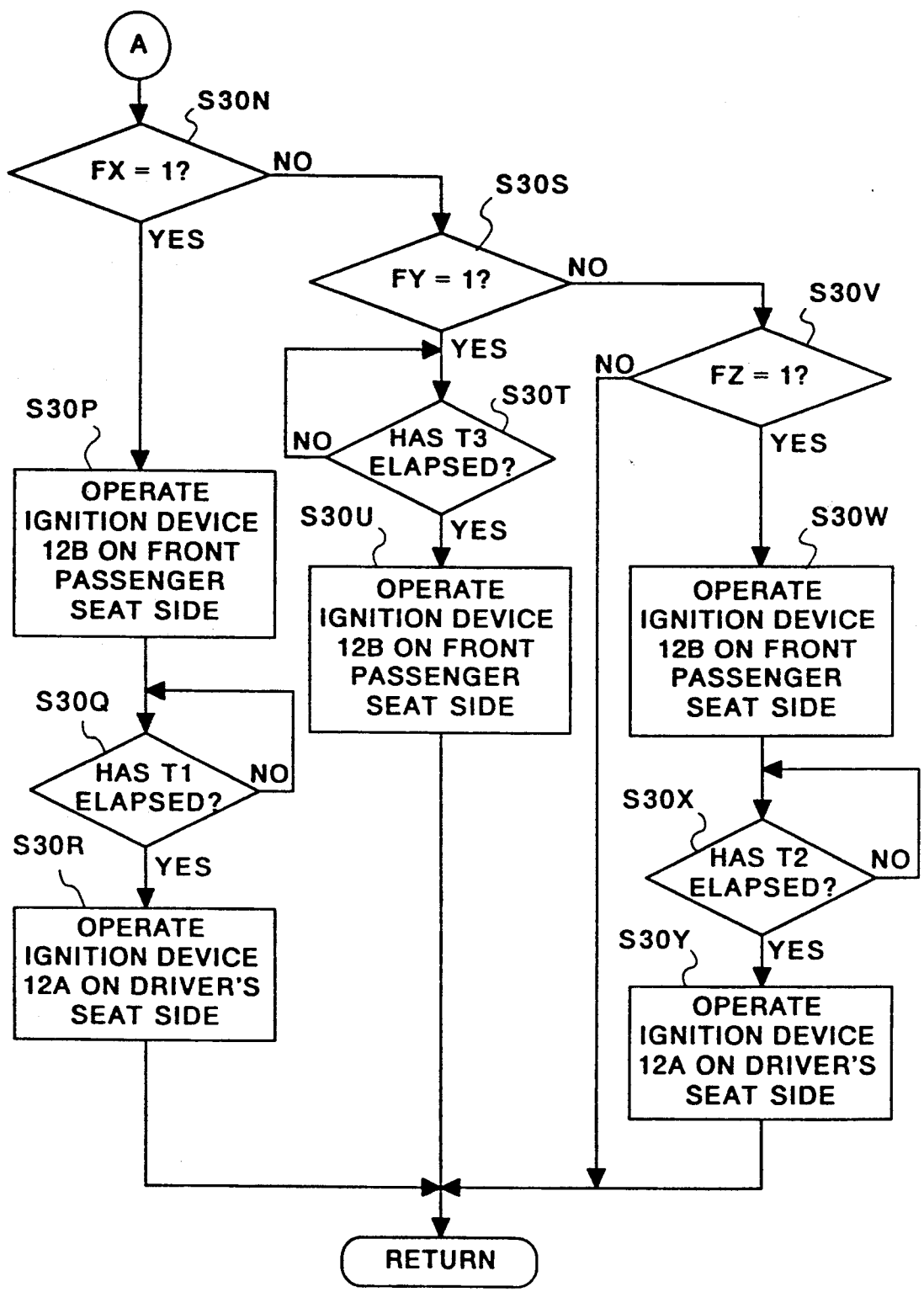

The control sequence of the air bag unfolding processing in step S30 will be described below as a subroutine with reference to FIGS. 19 and 20.

More specifically, as described above, if the flag FA is set or reset in step S28 or S32, the air bag unfolding processing in step S30 is started. As shown in FIG. 19, a timer T is reset in step S30A. ith this reset operation, a time-up operation of the timer T is started from zero. It is checked in step S30B if "1" is set in the flag FA indicating the side-collision state on the driver's seat 5A side. If YES in step S30B, i.e., if it is determined that the side collision occurs on the driver's seat 5A side, it is checked in step S30C if "1" is set in the flag FX indicating that two persons are on board.

If YES in step S30C, i.e., if it is determined that two persons are on board, since this means that the side collision occurred in a state wherein a person (driver B) sits at the collision side, the ignition device 12A on the driver's seat 5A side is energized to immediately unfold the air bag 13A on the driver's seat 5A side in step S30D. Thereafter, an elapse of the first delay time T1 described in the first embodiment in the timer T is waited in step S30E. If it is determined that the first delay time T1 has elapsed, the ignition device 12B on the front passenger's seat 5B side is energized to unfold the air bag 13B on the front passenger's seat 5B side in step S30F.

In this manner, after the air bag 13A on the driver's seat 5A side as the collision side is immediately unfolded, the air bag 13B on the front passenger's seat 5B side as a side opposite to the collision side is unfolded after an elapse of only the first delay time T1. When the unfolding operations of the two air bags 13A and 13B are completed, the control sequence in this subroutine is ended, and the flow returns to the main routine.

On the other hand, if NO in step S30C, i.e., if it is not determined that two persons are on board, it is checked in step S30G if "1" is set in the flag FY indicating that a person sits on only the driver's seat 5A. If YES in step S30G, i.e., if it is determined that only the driver D is on board, since this means that the side collision occurred in a state wherein the driver D sits on the collision side, the ignition device 12A on the driver's seat 5A side is energized to immediately unfold the air bag 13A on the driver's seat 5A side in step S30H. Thereafter, in step S30I, an elapse of the second delay time T2 described in the first embodiment in the timer T is waited. If it is determined that the second delay time T2 has elapsed, the ignition device 12B on the front passenger's seat 5B side is energized to unfold the air bag 13B on the front passenger's seat 5B side in step S30J.

In this manner, after the air bag 13A on the driver's seat 5A side as the collision side is immediately unfolded, the air bag 13B on the front passenger's seat 5B side as a side opposite to the collision side is unfolded after an elapse of only the second delay time T2. When the unfolding operations of the two air bags 13A and 13B are completed, the control sequence in this subroutine is ended, and the flow returns to the main routine.

If NO in step S30G, i.e., if it is determined that neither two persons nor only the driver D are on board, it is checked in step S30K if "1" is set in the flag FZ indicating that a person sits on only the front passenger's seat 5B. If YES in step S30K, i.e., if it is determined that only the passenger P is on board, since this means that the side collision occurred in a state wherein nobody sits on the collision side, an elapse of the third delay time T3 described in the first embodiment in the timer T is waited in step S30L. If it is determined that the third delay time T3 has elapsed, the ignition device 12A on the driver's seat 5A side is energized to unfold the air bag 13A on the driver's seat 5A side in step S30M.

In this manner, the air bag 13A on the driver's seat 5A side is unfolded after the elapse of the third delay time T3. When the unfolding operation of the air bag 13A on the collision side is completed, the control sequence in this subroutine is ended without unfolding the air bag 13B on the side opposite to the collision side, and the flow returns to the main routine.

If NO in step S30K, i.e., if it is determined that nobody sits on the front seats, even when a side collision occurs on the driver's seat 5A side, there is no need to protect passengers by unfolding the air bags 13A and 13B. For this reason, the control sequence in this subroutine is ended without energizing the two ignition devices 12A and 12B, and the flow returns to the main routine.

If NO in step S30B, i.e., if it is determined that the side collision occurred on the front passenger's seat 5B side, it is checked in step S30N if "1" is set in the flag FX indicating that two persons are on board.

If YES in step S30N, i.e., if it is determined that two persons are on board, since this means that the side collision occurred in a state wherein a person (passenger P) sits at the collision side, the ignition device 12B on the front passenger's seat 5B side is energized to immediately unfold the air bag 13B on the front passenger's seat 5B side in step S30P. Thereafter, an elapse of the first delay time T1 described in the first embodiment in the timer T is waited in step S30Q. If it is determined that the first delay time T1 has elapsed, the ignition device 12A on the driver's seat 5A side is energized to unfold the air bag 13A on the driver's seat 5A side in step S30R.

In this manner, after the air bag 13B on the front passenger's seat 5B side as the collision side is immediately unfolded, the air bag 13A on the driver's seat 5A side as a side opposite to the collision side is unfolded after an elapse of only the first delay time T1. When the unfolding operations of the two air bags 13A and 13B are completed, the control sequence in this subroutine is ended, and the flow returns to the main routine.

If NO in step S30N, i.e., if it is not determined that two persons are on board, it is checked in step S30S if "1" is set in the flag FY indicating that a person sits on only the driver's seat 5A. If YES in step S30S, i.e., if it is determined that only the driver D is on board, since this means that the side collision occurred in a state wherein nobody sits on the collision side, an elapse of the third delay time T3 described in the first embodiment in the timer T is waited in step S30T. If it is determined that the third delay time T3 has elapsed, the ignition device 12B on the front passenger's seat 5B side is energized to unfold the air bag 13B on the front passenger's seat 5B side in step S30U.

In this manner, the air bag 13B on the front passenger's seat 5B side is unfolded after the elapse of the third delay time T3. When the unfolding operation of the air bag 13B on the collision side is completed, the control sequence in this subroutine is ended without unfolding the air bag 13A on the side opposite to the collision side, and the flow returns to the main routine.

If NO in step S30S, i.e., if it is determined that neither two persons nor only the driver D are on board, it is checked in step S30V if "1" is set in the flag FZ indicating that a person sits on only the front passenger's seat 5B. If YES in step S30V, i.e., if it is determined that only the passenger P is on board, since this means that the side collision occurred when the passenger P sits at the collision side, the ignition device 12B on the front passenger's seat 5B side is energized to immediately unfold the air bag 13B on the front passenger's seat 5B side in step S30W. Thereafter, in step S30X, an elapse of the second delay time T2 described in the first embodiment in the timer T is waited. If it is determined that the second delay time T2 has elapsed, the ignition device 12A on the driver's seat 5A side is energized to unfold the air bag 13A on the driver's seat 5A side in step S30Y.

In this manner, after the air bag 13B on the front passenger's seat 5B side as the collision side is immediately unfolded, the air bag 13A on the driver's seat 5A side as a side opposite to the collision side is unfolded after an elapse of only the second delay time T2. When the unfolding operations of the two air bags 13A and 13B are completed, the control sequence in this subroutine is ended, and the flow returns to the main routine.

If NO in step S30V, i.e., if it is determined that nobody sits on the front seats, even when a side collision occurs on the front passenger's seat 5B side, there is no need to protect passengers by unfolding the air bags 13A and 13B. For this reason, the control sequence in this subroutine is ended without energizing the two ignition devices 12A and 12B, and the flow returns to the main routine.

In this manner, the control sequence of a series of air bag unfolding processing in step S30 is ended.

In the third embodiment, since passengers can be constrained by the right and left air bags 13A and 13B in the optimal unfolded states upon a side collision without using the electrical circuit shown in FIG. 4, protection of passengers can be guaranteed like in the first embodiment, and protection performance can be improved.

Fourth Embodiment

In the first and second embodiments, each of the side-collision units 4A and 4B comprises one air bag 13A or 13B. The present invention is not limited to this arrangement. For example, each side-collision unit may comprise two large and small air bags, as shown in FIGS. 12 to 24 as the fourth embodiment.

The structure of an air bag apparatus according to the fourth embodiment will be described in detail below with reference to FIGS. 21 to 24. The same reference numerals in this embodiment denote the same parts as in the first embodiment, and a detailed description thereof will be omitted. Like in the first embodiment, although the air bag apparatus of the fourth embodiment comprises two side-collision units 80A and 80B arranged in right and left doors 2A and 2B, they have symmetrical structures. Therefore, only the structure of the right (the driver's seat side) side-collision unit 80A will be described below, and a descriptin of the structure of the left (the front passenger's seat side) side-collision unit 80B will be omitted.

In the fourth embodiment, the present invention is applied to a vehicle air bag apparatus for further improving safety for passengers on the front seats in the side-collision state.

Figure 21:
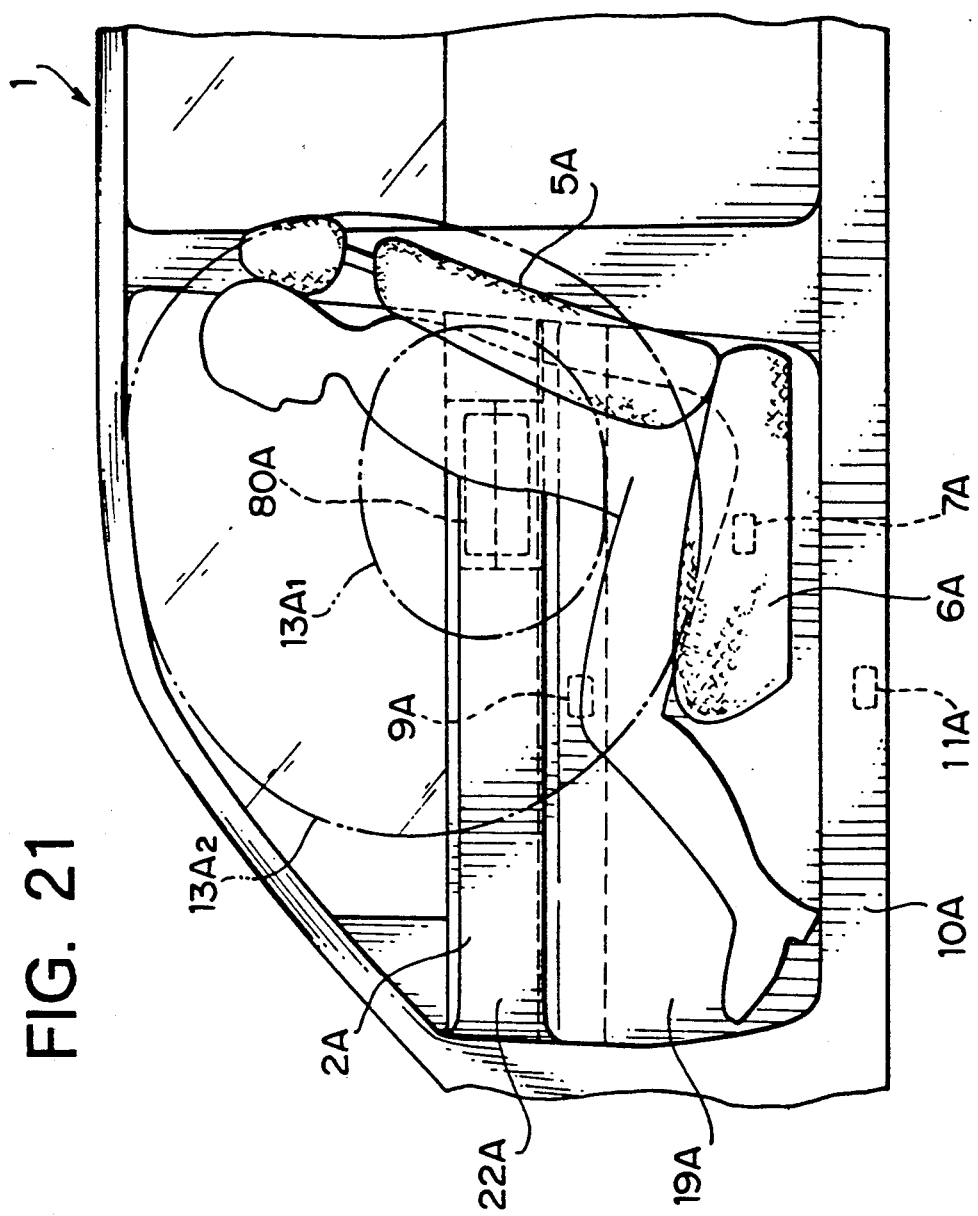
FIG. 21 is a side sectional view showing an unfolded state of an air bag in an energy absorbing structure for a vehicle body side portion according to the fourth embodiment of the present invention.
Figure 24:
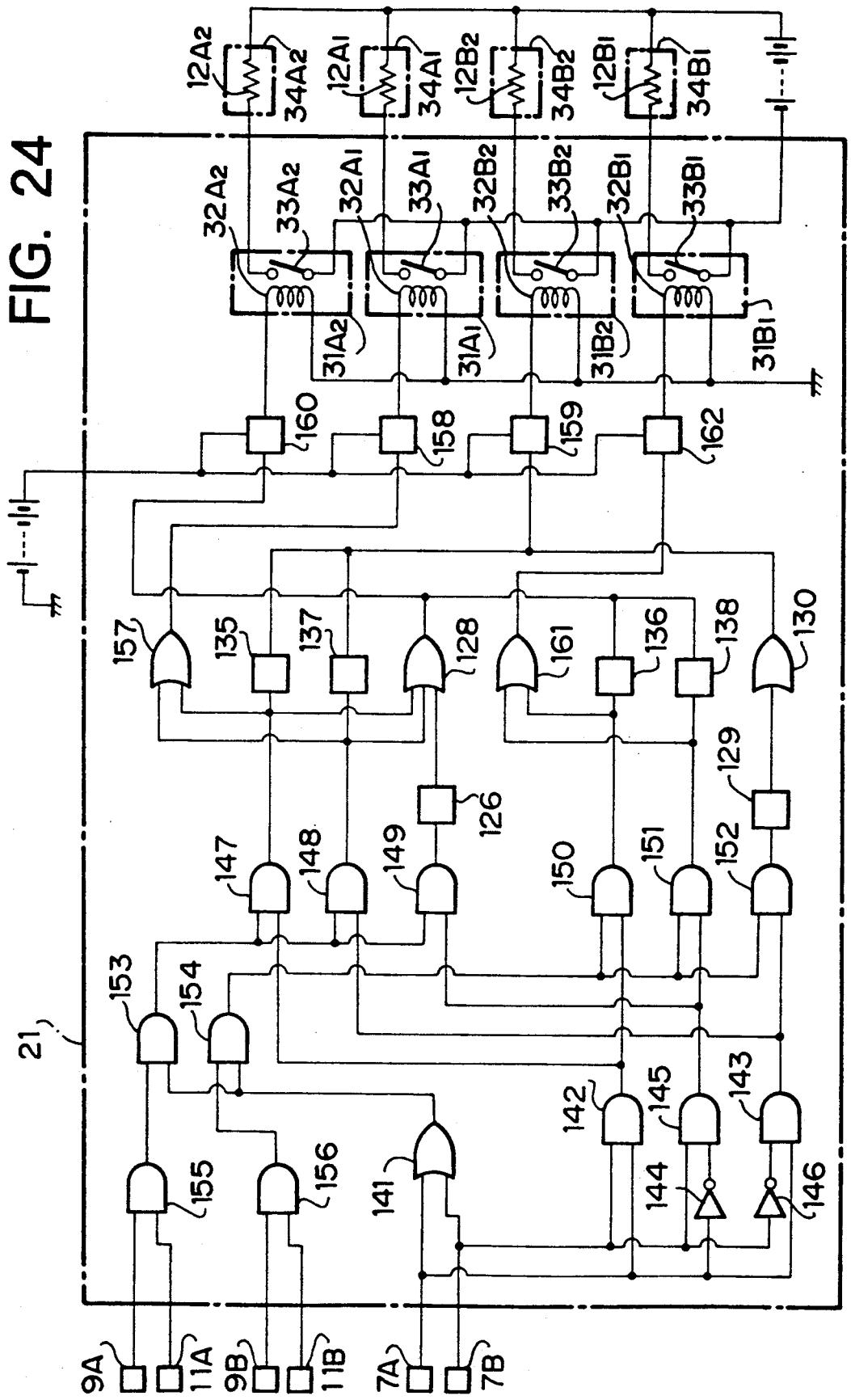
FIG. 24 is a circuit diagram showing an arrangement of a control unit used in the side-collision unit shown in FIG. 23.

As shown in FIG. 21, the air bag apparatus of the fourth embodiment comprises a pair of ignition devices $12A_1$ and $12A_2$ which are ignition-controlled by an internal control unit 21 (FIG. 24). The side-collision unit 80A comprises first and second air bags $13A_1$ and $13A_2$ which can be independently unfolded upon ignition by these ignition devices $12A_1$ and $12A_2$. The first air bag $13A_1$ is formed as small as a standard size, and the second air bag $13A_2$ is formed to be larger than the first air bag $13A_1$.

Figure 22:
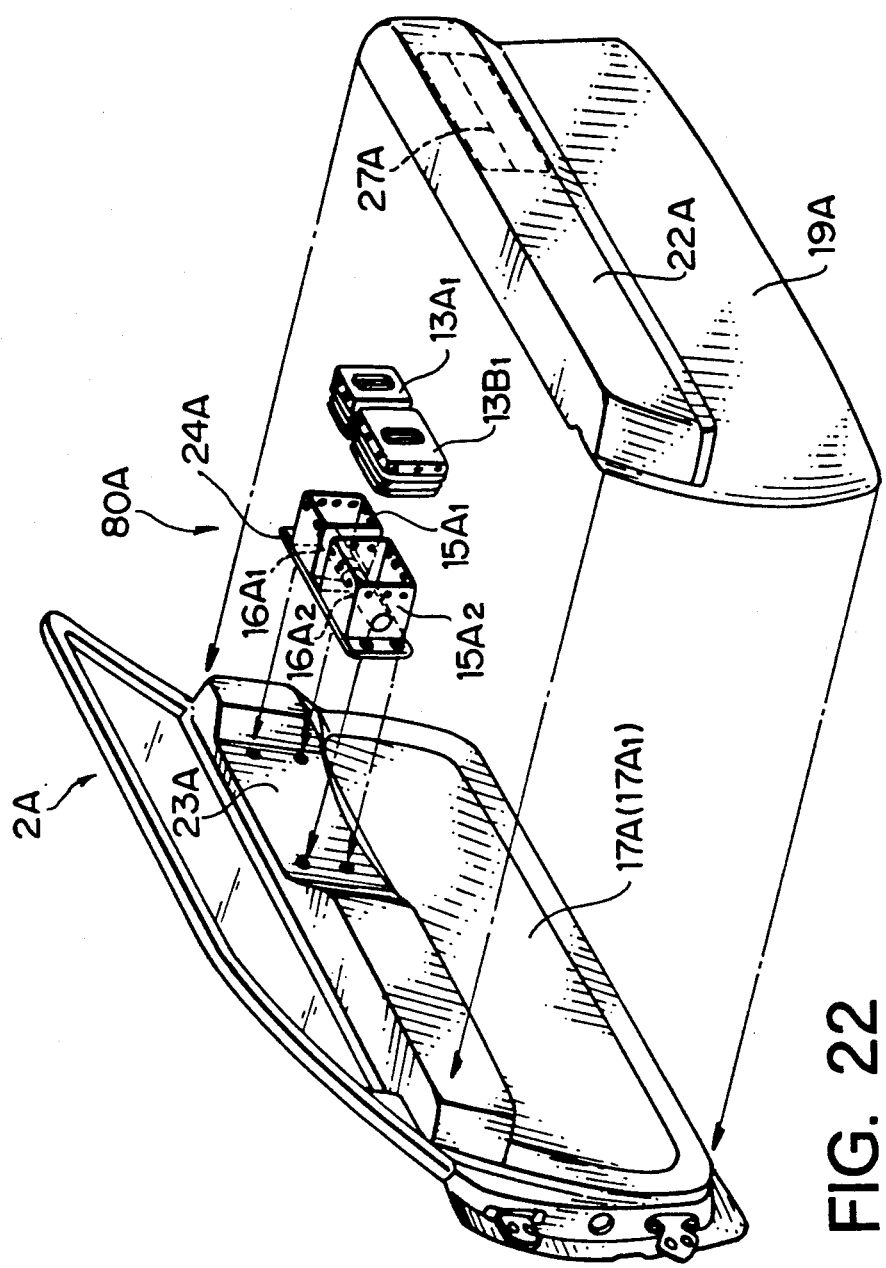
FIG. 22 is an exploded perspective view showing a structure of a door in which a side-collision unit for achieving the unfolded state of the air bag shown in FIG. 21 is mounted.
Figure 23:
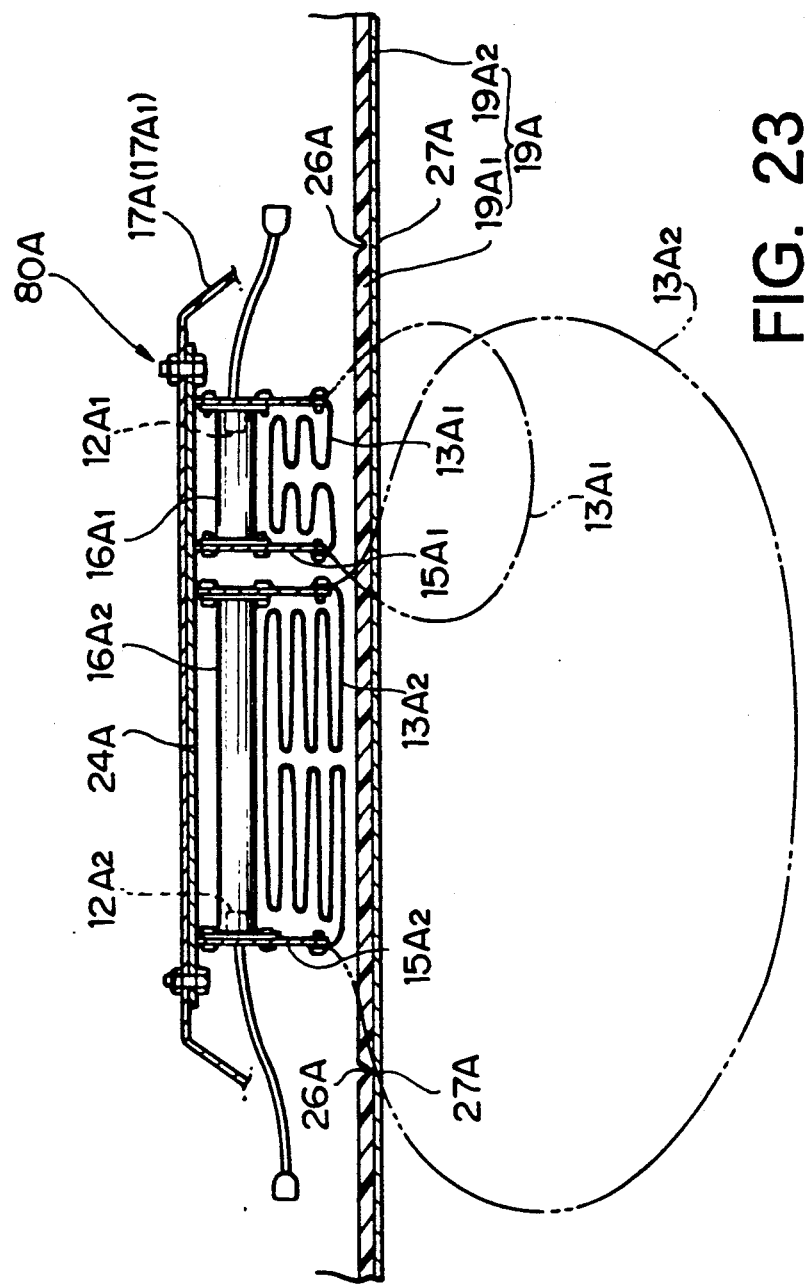
FIG. 23 is a cross-sectional view showing the structure of the side-collision unit according to the fourth embodiment for unfolding the air bag, as shown in FIG. 21.

As shown in FIGS. 22 and 23, a projecting portion 22A is formed on the upper portion of a door trim 19A of a right door 2A to extend in the back-and-forth direction of a vehicle body from the front edge to the rear edge of the upper portion of the door trim 19A, and to project into the passenger room. A storage portion 23A is formed between the rear portion of the projecting portion 22A and an inner panel 17A. A base plate 24A is fixed to the wall portion of the inner panel 17A facing the storage portion 23A. Two large and small frame-like module cases $15A_1$ and $15_2$ are airtightly fixed to the rear and front portions of the base plate 24A. Gas generators $16A_1$ and $16A_2$ for instantaneously generating a gas upon a reaction of a gas generating agent and a flammable agent are respectively housed in the right portions of the module cases $15A_1$ and $15_2$. The gas generators $16A_1$ and $16_2$ include first and second ignition devices $12A_1$ and $12A_2$ for generating heat upon energization to react the gas generating agent and the flammable agent, respectively.

The bag-like air bag $13A_1$ having the standard size is stored in the left portion of the rear-side module case $15A_1$ in a folded state, and the bag-like air bag $13A_2$ larger than the first air bag $13A_1$ is stored in the left portion of the front-side module case $15A_2$ in a folded state. The outer peripheral portions of the left ends of the air bags $13A_1$ and $13A_2$ are respectively airtightly fixed to the outer peripheral portions of the left ends of the module cases $15A_1$ and $15A_2$, and a plurality of vent holes (not shown) for exhausting gases in the air bags $13A_1$ and $13A_2$ are formed near the proximal end portions of the air bags $13A_1$ and $13A_2$, respectively.

A substantially H-shaped groove portion 26A is formed in a trim main body 19a of the door trim 19A in correspondence with the storage portion 23A, and perforations 27A are formed on an outer surface 19b covering the door trim 19A in correspondence with the groove portion 26A. As a result, when at least one of the ignition devices $12A_1$ and $12A_2$ is energized, a large amount of gas is generated from the corresponding gas generator $16A_2$ or $16A_2$, so that the air bag $13A_1$ or $13A_2$ corresponding to the energized ignition device $12A_1$ or $12A_2$ breaks the groove portion 26A formed in the trim main body 19a of the door trim 19A, and the perforations 27A formed in the outer surface 19b in turn by gas compression, and is inflated and unfolded between a passenger and the door 2A.

A reaction rate of the gas generating agent and the flammable agent, te capacities of the air bags $13A_1$ and $13A_2$, and the opening area of the vent holes are respectively set to be predetermined values, so that the first air bag $13A_1$ can be fully unfolded after an elapse of about 10 msec from the operation of the first ignition device $12A_1$, and the second air bag $13A_2$ can be fully unfolded after an elapse of about 50 msec from the operation of the second ignition device $12A_2$.

The arrangement of the control unit 21 will be described in detail below with reference to FIG. 24.

As shown in FIG. 21, the control unit 21 comprises four relay switches $31A_1$, $31A_2$, $31B_1$, and $31B_2$ for respectively turning on/off the ignition devices $12A_1$ and $12A_2$ of the side-collision unit 80A on the driver's seat 5A side, and the ignition units $12B_1$ and $12B_2$ of the side-collision unit 80B on the front passenger's seat 5B side. When solenoids $32A_1$, $32A_2$, $32B_1$, and $32B_2$ corresponding to the relay switches $31A_1$, $31A_2$, $31B_1$, and $31B_2$ are excited to turn on switches $33A_1$, $33A_2$, $33B_1$, and $33B_2$, heaters $34A_1$, $34A_2$, $34B_1$, and $34B_2$ of the ignition devices $12A_1$, $12A_2$, $12B_1$, and $12B_2$ corresponding to the ON switches $33A_2$, $33A_2$, $33B_1$, and $33B_2$ are energized.

A seat sensor 7A on the driver's seat side is connected to an OR gate 141, and AND gates 142 and 143, and is also connected to an AND gate 145 via a NOT gate 144. A seat sensor 7B on the front passenger's seat side is connected to the OR gate 141, and the AND gates 142 and 145, and is also connected to the AND gate 143 via a NOT gate 146. The AND gate 142 is connected to AND gates 147 and 150. The AND gate 143 is connected to AND gates 148 and 152. The AND gate 145 is connected to AND gates 149 and 151. The OR gate 141 is connected to AND gates 153 and 154.

On the other hand, shock sensors 9A and 11A on the driver's seat side are connected to the AND gate 153 via an AND gate 155. Shock sensors 9B and 11B on the front passenger's seat side are connected to the AND gate 154 via an AND gate 156. The AND gate 153 is connected to the AND gates 147 to 149. The AND gate 154 is connected to the AND gates 150 to 152.

The AND gate 147 is connected to a driving circuit 158 via an OR gate 157, and is also connected to a driving circuit 159 via a first delay circuit 135. In this manner, in a side-collision state to the driver's seat 5A side occurring when both a driver D and a passenger P are on board, the ignition device $12A_1$ on the driver's seat side is operated immediately after the side collision, and the small first air bag 13A on the driver's seat 5A side is fully unfolded immediately before the driver D collides against the door 2A on the driver's seat 5A side. After an elapse of a first delay time T1 defined by the first delay circuit 135 from detection of the side collision, the ignition device $12B_2$ on the front passenger's seat 5B side is operated. As a result, the large second air bag $13B_2$ on the front passenger's seat 5B side is fully unfolded immediately before the passenger P contacts the door 2B. That is, in the above-mentioned side-collision state, the passenger P is first moved toward the driver's seat 5A side as the collision side by the inertia in the collision. When the shock in the side collision is large, the driver D is received by the first air bag $13A_1$ on the driver's seat 5A side, bounces on this bag, and is then moved to the opposite side. The passenger P contacts the driver D moving to the side opposite to the collision side, is moved (returned) to the side opposite to the collision side together with the driver D, and is then received by the fully unfolded large second air bag $13B_2$ on the opposite side.

The AND gate 148 is connected to the driving circuit 158 via the OR gate 157, and is also connected to the driving circuit 159 via a second delay circuit 137. As a result, in a side-collision state to the driver's seat side occurring when only the driver D is on board, the first ignition device $12A_2$ on the driver, seat side is operated immediately after the side collision, and the small first air bag $13A_1$ on the driver's seat side is fully unfolded immediately before the driver D contacts the door 2A on the driver's seat 5A side. After an elapse of a second delay time T2 defined by the second delay circuit 137 from detection of the collision, the second ignition device $12B_2$ is operated, and the large second air bag $13B_2$ on the front passenger's seat 5B side is fully unfolded before the driver D contacts the door 2B on the front passenger's seat 5B side. More specifically, in the above-mentioned side-collision state, the driver D is first received by the small first air bag $13A_1$ on the driver's seat side. When a collision shock is large, the driver bounces on the first air bag $13A_1$, and is then moved to the opposite side. In this case, the driver can be received by the fully unfolded large second air bag $13B_2$ on the front passenger's seat side.

The AND gate 149 is connected to a driving circuit 160 sequentially through a third delay circuit 126 and an OR gate 127. The OR gate 127 receives the outputs from the AND gates 147 and 148. As a result, in a side-collision state to the driver's seat side occurring when only the passenger P is on board, the second ignition device $12A_2$ on the driver's seat side is operated after an elapse of a third delay time T3 defined by the third delay circuit 126 from detection of the collision, and the large second air bag $13A_2$ on the driver's seat side is fully unfolded immediately before the passenger P contacts the door 2A. More specifically, in the side-collision state, even when the passenger P is moved toward the driver's seat 5A side, he or she can be received by the fully unfolded large second air bag $13A_2$ on the driver's seat side.

The AND gate 150 is connected to a driving circuit 162 via an OR gate 161, and is also connected to the driving circuit 160 via a fourth delay circuit 136. As a result, in a side-collision state to the front passenger's seat 5B side occurring when both the driver D and the passenger P are on board, in contrast to the side-collision state to the driver's seat 5A side, the first ignition device 12B on the front passenger's seat 5B side is operated immediately after the side collision, and the small first air bag $13B_1$ on the front passenger's seat side is fully unfolded immediately before the passenger P contacts the door 2B. After an elapse of the same delay time defined by the fourth delay circuit as the first delay time T1 in the first delay circuit 135 from detection of the side collision, the second ignition device $12A_2$ on the driver's seat side is operated. As a result, the large second air bag $13A_2$ on the driver's seat side is fully unfolded immediately before the driver D contacts the door 2A.

The AND gate 151 is connected to the driving circuit 162 via the OR gate 161, and is also connected to the driving circuit 160 via a fifth delay circuit 138. As a result, in a side-collision state to the front passenger's seat side occurring when only the passenger P is on board, in contrast to the side-collision state to the driver's seat side, the first ignition device 12B on the front passenger's seat side is operated immediately after the side collision, and the small first air bag $13B_1$ on the front passenger's seat side is fully unfolded immediately before the passenger P contacts the door 2B. After an elapse of the same delay time, defined by the fifth delay circuit 138, as the second delay time T2 in the second delay circuit 137 from detection of the collision, the second ignition device $12A_2$ is operated. As a result, even when the passenger P is moved toward the driver's seat side after he or she bounces on the first air bag $13B_1$, the large second air bag $13A_2$ on the driver's seat side is fully unfolded immediately before he contacts the door 2A.

The AND gate 152 is connected to the driving circuit 159 sequentially through a sixth delay circuit 129 and an OR gate 130. The OR gate 130 receives the outputs from the AND gates 150 and 151. As a result, in a side-collision state to the front passenger's seat side occurring when only the driver D is on board, in contrast to the side-collision state to the driver's seat side, after an elapse of the same delay time, defined by the sixth delay circuit 129, as the third delay time T3 in the third delay circuit 126 from the side collision, the second ignition device $12B_2$ on the front passenger's seat side is operated. As a result, even when the driver D is moved to the front passenger's seat side by the inertia of the collision, the large second air bag $13B_2$ on the front passenger's seat side is fully unfolded immediately before he or she contacts the door 2B.

Note that in a side-collision state occurring when nobody sits on the front seats 5A and 5B, none of a total of four right and left air bags $13A_1$, $13A_2$, $13B_1$, and $13B_2$ are unfolded.

The delay times T1, T2, and T3 for setting energization timings to the heaters $34A_1$, $34A_2$, $34B_1$, and $34B_2$ in accordance with on-board conditions of passengers are the same as those in the first embodiment described above, and a detailed description thereof will be omitted.

A side-collision energy absorbing function of the air bag apparatus with the above-mentioned arrangement will be described below.

When passengers sit on both the side-collision side and on the side opposite thereto, the small first air bag $13A_1$ or $13B_2$ on the collision side is fully unfolded immediately after the collision, more specifically, after an elapse of a predetermined period of time (about 20 msec). The passenger on the collision side is received by the fully unfolded air bag, and a secondary collision between the passenger on the collision side and the door 2A or 2B on the collision side can be prevented. After an elapse of the first delay time (about 340 msec) from the collision, the large second air bag $13A_2$ or $13B_2$ on the side opposite to the collision side is fully unfolded. As a result, even when the passenger on the collision side is thrown toward the opposite side by the shock from the door on the collision side, and is moved to the side opposite to the collision side together with the other passenger, a tertiary collision between the passenger and the door 2A or 2B on the side opposite to the collision side can be effectively prevented by the fully unfolded large second air bag $13A_2$ or $13B_2$ on the side opposite to the collision side.

When a passenger sits at only the side-collision side, the small first air bag $13A_1$ or $13B_1$ on the collision side is fully unfolded immediately after the collision, more specifically, after an elapse of a predetermined period of time (about 20 msec). The passenger on the collision side is received by the fully unfolded air bag, and a secondary collision between the passenger on the collision side and the door 2A or 2B can be prevented. After an elapse of the second delay time (about 180 msec) from the collision, the large second air bag $13A_2$ or $13B_2$ on the side opposite to the collision side is fully unfolded. As a result, even when the passenger on the collision side is thrown toward the side opposite to the collision side by a shock from the door entering the passenger room, a tertiary collision between the passenger and the door 2A or 2B on the collision side can be effectively prevented by the fully unfolded large air bag $13A_2$ or $13B_2$ on the side opposite to the collision side.

When a passenger sits on only the side opposite to the side-collision side, the large second air bag $13A_2$ or $13B_2$ on the collision side is fully unfolded after an elapse of the third delay time (about 130 msec) from the collision to, e.g., the driver's seat side. As a result, even when the passenger is thrown toward the collision side by the inertia of the collision, a secondary collision between the passenger and the door 2A or 2B on the collision side can be effectively prevented by the fully unfolded large second air bag $13A_2$ or $13B_2$ on the collision side.

As described above, in the fourth embodiment, when a side collision occurs, if a passenger sits at the collision side, a secondary collision between the passenger on the collision side and the door 2A or 2B on the collision side can be effectively prevented by the small (standard-size) first air bag $13A_1$ or $13B_1$ which is fully unfolded immediately after the collision. A tertiary collision between the passenger on the collision side and the door 2A or 2B on the side opposite to the collision side can be reliably prevented by the second air bag $13A_2$ or $13B_2$ on the side opposite to the collision side, which bag is unfolded to be larger than the first air bag $13A_1$ or $13B_1$. When another passenger sits on the side opposite to the collision side, a secondary collision between the passenger on the side opposite to the collision side and the door 2A or 2B on the side opposite to the collision side can be reliably prevented by the second air bag $13A_2$ or $13B_2$ on the side opposite to the collision side.

Furthermore, in the fourth embodiment, the unfolding operations of the large and small air bags $13A_1$, $13A_2$, $13B_1$, and $13B_2$ are selectively executed in accordance with the on-board conditions of passengers. More specifically, when a passenger sits on the collision side, the side-collision unit on the collision side is set to unfold the small first air bag $13A_1$ or $13B_1$. As a result, the first air bag $13A_1$ or $13B_1$ can be fully unfolded within a short period of time, and can receive a passenger without an undesirable delay time. On the other hand, the side-collision unit on the side opposite to the collision side when a passenger sits on the collision side is set to unfold the large second air bag $13A_2$ or $13B_2$. As a result, a passenger who is moved over a long distance toward the side opposite to the collision side in the passenger room can be reliably received by the largely unfolded second air bag $13A_2$ or $13B_2$. Furthermore, when a passenger sits on only the side opposite to the collision side, the side-collision unit on the collision side is set to unfold the large second air bag $13A_2$ or $13B_2$. As a result, a passenger who is moved over a long distance toward the collision side in the passenger room can be reliably received by the largely unfolded second air bag $13A_2$ or $13B_2$.

In the fourth embodiment described above, in the control unit 21, the first, second, fourth, and fifth delay circuits 135, 136, 137, and 138 may be omitted, the AND gates 147 and 148 may be connected to the driving circuit 159 via an OR gate, and the AND gates 150 and 151 may be connected to the driving circuit 160 via an OR gate. As a result, when a passenger sits on the side-collision side, the first ignition device $12A_1$ or $12B_1$ on the collision side, and the second ignition device $12A_2$ or $12B_2$ on the side opposite to the collision side are simultaneously operated. More specifically, it is most preferable to receive a passenger on the collision side by the fully unfolded second air bag $13A_2$ or $13B_2$. However, since a time required for fully unfolding the second air bag $13A_2$ or $13B_2$ is relatively long, even when the first ignition device $12A_1$ or $12B_1$ on the collision side, and the second ignition device $12A_2$ or $12B_2$ on the side opposite to the collision side are simultaneously operated, the passenger on the collision side can be received by the substantially fully unfolded second air bag $13A_2$ or $13B_2$.

Moreover, in the fourth embodiment described above, in the control unit 21, the third and sixth delay circuits 126 and 129 may be omitted, the AND gate 129 may be directly connected to the driving circuit 160, and the AND gate 152 may be directly connected to the driving circuit 158. As a result, when a passenger sits on only the side opposite to the collision side, the second ignition device $12A_2$ or $12B_2$ on the collision side is operated. That is, for the above-mentioned reason, since a time required for fully unfolding the second air bag $13A_2$ or $13B_2$ is relatively long, even when the second ignition device $12A_2$ or $12B_2$ on the collision side is immediately operated, a passenger on the side opposite to the collision side can be effectively received by the substantially fully unfolded second air bag $13A_2$ or $13B_2$.

In the control unit 21, the ignition devices $12A_1$, $12B_1$, $12A_2$, and $12B_2$ are operated on the basis of the outputs from the seat sensors 7A and 7B. The seat sensors 7A and 7B may be omitted, and the first air bag $13A_1$ or 13B on the collision side and the second air bag $13A_2$ or $13B_2$ on the side opposite to the collision side may be unfolded in a side-collision state simultaneously or after an elapse of a given delay time regardless of the on-board conditions of passengers.

First Modification

The arrangement of the control unit 21 in the fourth embodiment described above may be partially modified as a control unit 21A as follows. Note that the same reference numerals in this modification denote the same parts as in the fourth embodiment, and a detailed description thereof will be omitted.

Figure 25:
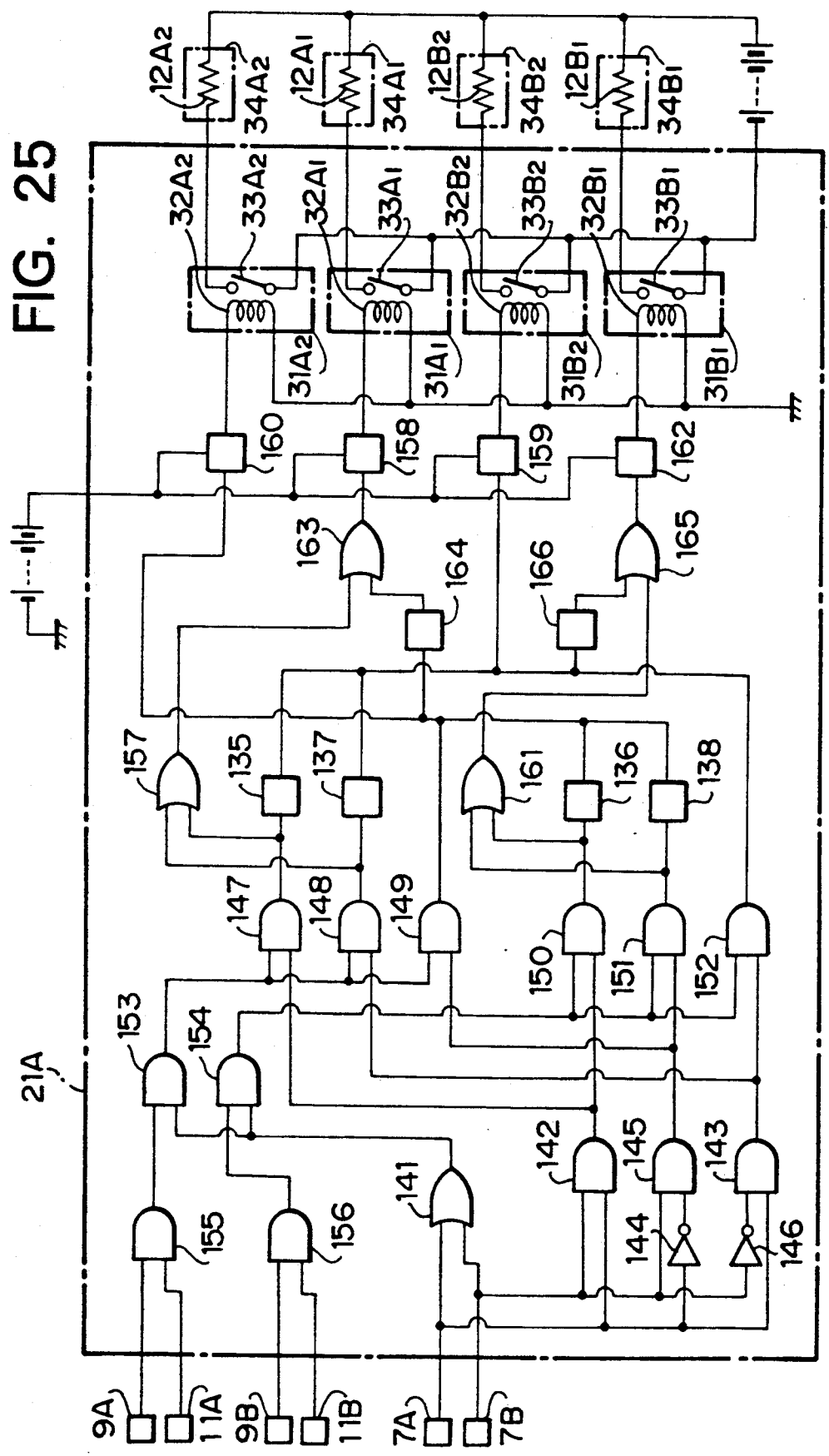
FIG. 25 is a circuit diagram showing a first modification of the arrangement of the control unit shown in FIG. 24.

The control unit 21A will be described below. As shown in FIG. 25, the OR gate 157 is connected to the driving circuit 158 via an OR gate 163. The fourth delay circuit 136, the fifth delay circuit 138, and the AND gate 149 are connected to the driving circuit 160. The AND gate 149 is also connected to the OR gate 163 via a seventh delay circuit 164. The OR gate 161 ss connected to the driving circuit 162 via an OR gate 165. The first delay circuit 135, the second delay circuit 137, and the AND gate 152 are connected to the OR gate 165 via an eighth delay circuit 166.

A fourth delay time T4 defined by the seventh and eighth delay circuits 164 and 166 defines a difference between unfolding times of the first and second air bags $13A_1$ and $13A_2$. In this modification, T4=40 msec is set.

In this manner, in the air bag apparatus comprising the control unit 21A according to the first modification, the first air bag $13A_1$ or $13B_1$, and the second air bag $13A_2$ or $13B_2$ are unfolded at predetermined timings like in the fourth embodiment. Furthermore, as an operation unique to the first modification, on the side opposite to the collision side, the first ignition device $12A_1$ or $12B_1$ is operated after an elapse of the fourhh delay time T4 from the operation of the second ignition device $12A_2$ or $12B_2$, so that the small first air bag $13A_1$ or $13B_1$ begins to be unfolded after an elapse of a given delay time from the beginning of unfolding of the large second air bag $13A_2$ or $13B_2$. The fourth delay time T4 is set to be a time enough to fully unfold the small first air bag $13A_1$ or $13B_1$, and the large second air bag $13A_2$ or $13B_2$ at the same time. As a result, at the side opposite to the collision side, the large second air bag $13A_2$ or $13B_2$ and the small first air bag $13A_1$ or $13B_1$ are fully unfolded at the same time. As a result, a passenger on the collision side can be effectively received by the fully unfolded two air bags $13A_1$ and $13A_2$, or $13B_1$ $13B_2$ on the side opposite to the collision side.

Note that the first and fourth delay circuits 135 and 136, and the second and fifth delay circuits 137 and 138 in the control unit 21A in the first modification may be omitted, and the AND gates 147 and 148 may be connected to the driving circuit 159 and the third delay circuit 166 respectively through an OR gate and the AND gates 150 and 151. As a result, when a passenger sits at the side-collision side, the first ignition device $12A_1$ or $12B_1$ on the collision side, and the second ignition device $12A_2$ or $12B_2$ on the opposite side are simultaneously operated like in the fourth embodiment. The seventh and eighth delay circuits 164 and 166 may be omitted, so that the first ignition device $12A_1$ or $12B_1$ and the second ignition device $12A_2$ or $12B_2$ on the same side may be simultaneously operated.

In the control unit 21A, the ignition devices $12A_2$, $12B_1$, $12A_2$, and $12B_2$ are operated on the basis of the outputs from the seat sensors 7A and 7B. The seat sensors 7A and 7B may be omitted, and the first air bag $13A_1$ or $13B_1$ on the collision side and the second air bag $13A_2$ or $13B_2$ on the side opposite to the collision side may be unfolded in a side-collision state simultaneously or after an elapse of a given delay time regardless of the on-board conditions of passengers.

Second Modification

The arrangement of the control unit 21A in the first modification may be partially modified as a control unit 21B as follows. Note that the same reference numerals in this modification denote the same parts as in the fourth embodiment and the first modification, and a detailed description thereof will be omitted.

Figure 26:
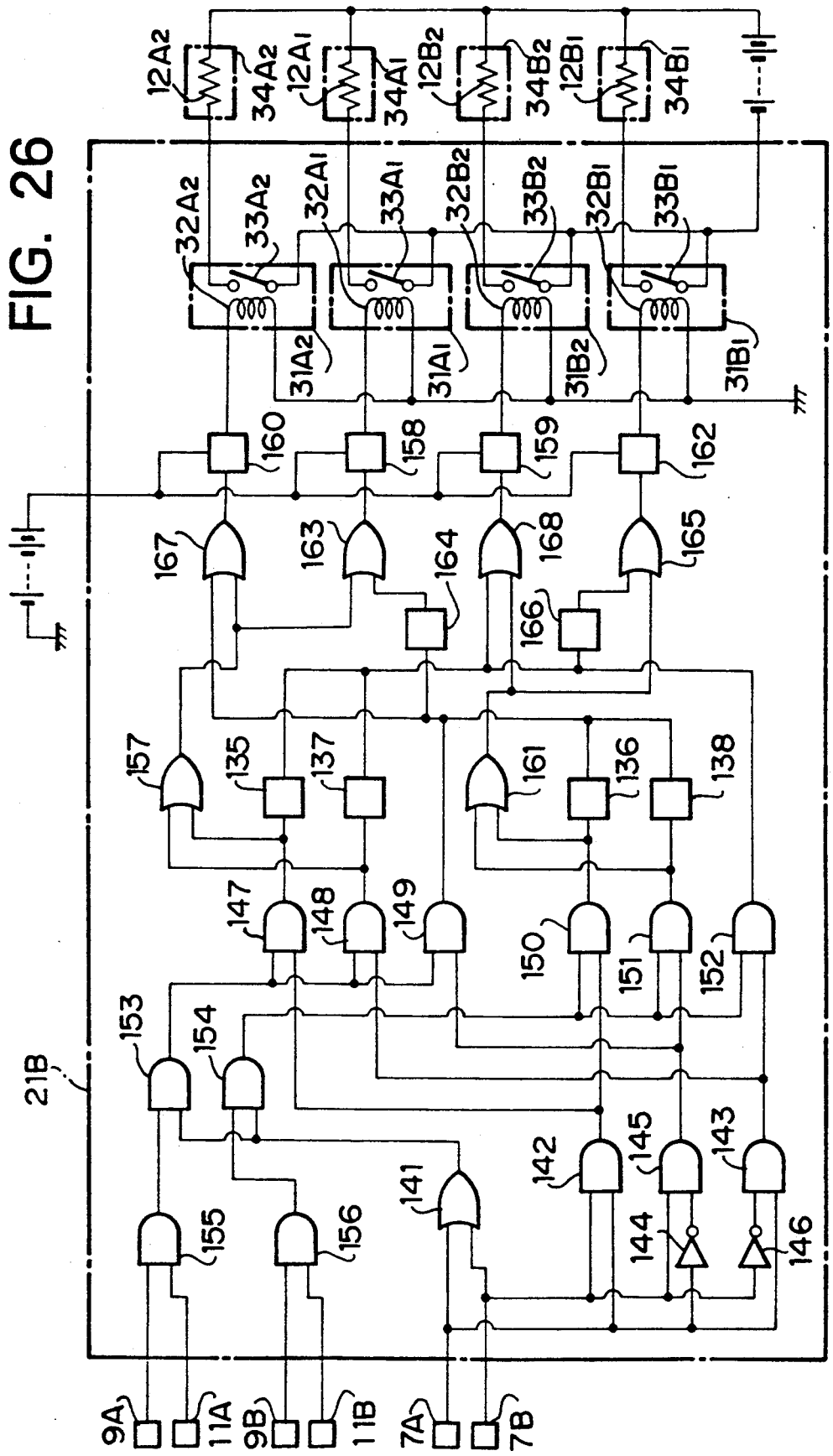
FIG. 26 is a circuit diagram showing a second modification of the arrangement of the control unit shown in FIG. 24.

The control unit 21B will be described below. As shown in FIG. 26, the OR gate 157 is connected to the driving circuit 158 via the OR gate 163, and is also connected to the driving circuit 160 via an OR gate 167. The AND gate 149, the fourth delay circuit 136, and the fifth delay circuit 138 are connected to the OR gate 167, and are also connected to the seventh delay circuit 164. The OR gate 161 is connected to the driving circuit 159 via an OR gate 168, and is also connected to the driving circuit 162 via the OR gate 165. The AND gate 152, the first delay circuit 135, and the second delay circuit 137 are connected to the OR gate 168.

In this manner, in the air bag apparatus comprising the control unit 21B according to the second modification, the first air bag $13A_1$ or $13B_1$, and the second air bag $13A_2$ or $13B_2$ are unfolded at predetermined timings like in the fourth embodiment. Furthermore, as an operation unique to the second modification, on the collision side, the second air bag $13A_2$ or $13B_2$ is unfolded simultaneously with unfolding of the first air bag $13A_1$ or $13B_1$, so that a passenger on the collision side can be effectively received by the two air bags $13A_1$ and $13A_2$ or $13B_1$ and $13B_2$. The first air bag $13A_1$ or $13B_1$ on the side of the unfolded second air bag $13A_2$ or $13B_2$ begins to be unfolded after an elapse of the fourth delay time T4 from the operation of the second ignition device $12A_2$ or $12B_2$ for the second air bag $13A_2$ or $13B_2$. As a result, the first air bag $13A_1$ or $13B_1$ is fully unfolded simultaneously with the second air bag $13A_2$ or $13B_2$, and a passenger can be effectively received by the fully unfolded two air bags $13A_1$ and $13A_2$ or $13B_1$ and $13B_2$.

Note that the first and fourth delay circuits 135 and 136, and the second and fifth delay circuits 137 and 138 of the control unit 21B may be omitted, the AND gates 147 and 148 may be connected to the OR gate 168 and the eighth delay circuit 166 via an OR gate, and the AND gates 150 and 151 may be connected to the OR gate 167 and the seventh delay circuit 164 via an OR gate. In this manner, when a passenger sits on the side-collision side, the first ignition device $12A_1$ or $12B_1$ on the collision side, and the second ignition device $12A_2$ or $12B_2$ on the opposite side are simultaneously operated like in the fourth embodiment. The seventh and eighth delay circuits 164 and 166 may be omitted, so that the first ignition device $12A_1$ or $12B_1$ and the second ignition devices $12A_2$ or $12B_2$ on the same side may be simultaneously operated.

In the control unit 21B, the ignition devices $12A_1$, $12B_1$, $12A_2$, and $12B_2$ are operated on the basis of the outputs from the seat sensors 7A and 7B. The seat sensors 7A and 7B may be omitted, and the first air bag $13A_1$ or $13B_1$ on the collision side and the second air bag $13A_2$ or $13B_2$ on the side opposite to the collision side may be unfolded in a side-collision state simultaneously or after an elapse of a given delay time regardless of the on-board conditions of passengers.

Note that the control unit 21, 21A, or 21B is merely an example, and an arrangement assembled with a microcomputer or a programmable controller may be adopted.

Fifth Embodiment

In the fourth embodiment described above, each of the side-collision units $80A_1$ and 80B independently comprises two air bags 13A or 13B. However, the present invention is not limited to this arrangement. For example, as shown in FIG. 27 as the fifth embodiment, an air bag which is finally unfolded as a single air bag is partially unfolded as a small air bag portion, and the remaining portion is folded so that it can be unfolded as a large air bag portion.

The structure of the air bag apparatus according to the fifth embodiment will be described below with reference to FIG. 27. In the following description, the same reference numerals denote the same parts as in the fourth embodiment, and a detailed description thereof will be omitted. Like in the fourth embodiment, the air bag apparatus of the fifth embodiment comprises side-collision units 90A and 90B respectively arranged in right and left doors. However, since the side-collision units 90A and 90B have symmetrical structures, only the right (driver's seat side) side-collision unit 90A will be described below, and a description of the left (front passenger's seat side) side-collision unit 90B will be omitted.

Figure 27:
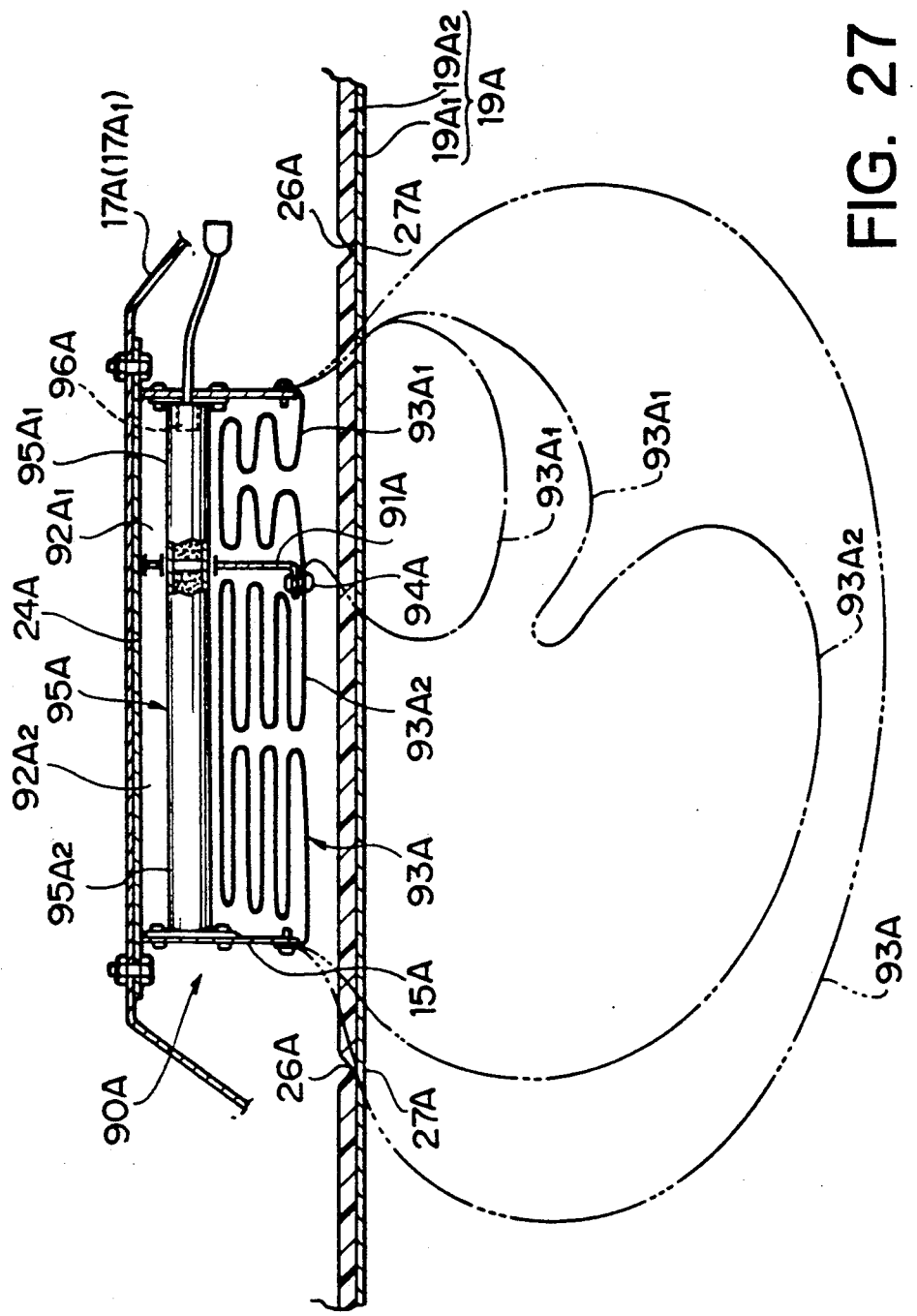
FIG. 27 is a cross-sectional view showing an arrangement of an energy absorbing structure for a vehicle body side portion according to the fifth embodiment of the present invention.

As shown in FIG. 27, the side-collision unit 90A is stored in a mounting portion 23A formed between a door inner panel $17A_1$ and a door trim 19A like in the fourth embodiment described above. A base plate 24A is fixed to the left end face of the door inner panel $17A_1$. A frame-like module case 15A is airtightly fixed to the left end face of the base plate 24A. The interior of the module case 15A is partitioned into a pair of front and rear storage chambers $92A_1$ and $92A_2$ by a partition wall 91A. A large air bag 93A is stored to extend over the two storage chambers $92A_1$ and $92A_2$. The air bag 93A is partitioned into a rear bag portion $93A_1$ (corresponding to the small first air bag $13A_1$ in the fourth embodiment) stored in the left-side portion of the rear small storage chamber $92A_1$ in the widthwise direction of a vehicle, and a front bag portion $93A_2$ (corresponding to the large second air bag $13A_2$) stored in the left-side portion of the front large storage chamber $92A_2$. These bag portions are stored in a folded state.

The outer peripheral portion of the left end of the air bag 93A is airtightly fixed to the outer peripheral portion of the left end of the module case 15A. A portion between the rear and front bag portions $93A_1$ and $93A_2$ is removably coupled to the left end portion of the partition wall 91A via a fastener 94A. In the right portion of the module case 15A, the gas generator 95A is arranged to extend over the rear and front storage chambers $92A_1$ and $92_2$. An ignition device 96A is arranged in the gas generator 95A.

The gas generator 95A is integrally constituted by a first gas generator $95A_1$ for generating a gas immediately after the operation of the ignition device 96A, and a second gas generator $95A_2$ for generating a gas after an elapse of a predetermined period of time from the operation of the ignition device 96A. The gas generators $95A_1$ and $95A_2$ are stored to be located in the storage chambers $92A_1$ and $92A_2$, respectively. As a result, when the ignition device 96A is operated, the rear bag portion $93A_1$ is unfolded into the passenger room by a gas generated by the first gas generator $95A_1$, as indicated by an alternate long and short dashed line in FIG. 27, and after an elapse of a predetermined period of time, the front bag portion $93A_2$ is unfolded by a gas generated by the second gas generator $95A_2$. When a gas pressure in the rear and front bag portions $93A_1$ and $93A_2$ exceeds a predetermined value, the fastener 94A is disengaged, and the large air bag 93A consisting of the rear and front bag portions $93A_1$ and $93A_2$ is extended in the passenger room, as indicated by an alternate long and three short dashed line.

In the air bag apparatus of the fifth embodiment with the structure described above, when a side collision is detected, the ignition devices 96A and 96B are simultaneously operated in both the side-collision units 90A and 90B on the collision side and on the side opposite thereto, and the small rear bag portions 93A and 93B begin to be unfolded. Thus, a secondary collision between a passenger on the collision side and the door 2A or 2B can be effectively prevented by the small (standard-size) rear bag portions $93A_1$ and $93B_1$ which can be fully unfolded within a relatively short period of time. After an elapse of a predetermined period of time from the beginning of unfolding of the small rear bag portions $93A_1$ and $93B_1$, the large front bag portions $93A_2$ and $93B_2$ begin to be unfolded. As a result, a tertiary collision between a passenger on the collision side and the door 2A or 2B on the side opposite to the collision side, and a secondary collision between a passenger on the side opposite to the collision side and the door 2A or 2B on the collision side can be effectively prevented by the largely unfolded front bag portions 93A$_2$ and 93B$_2$.

Note that the rear and front air bags 93A$_1$ and 93A$_2$ may be unfolded simultaneously or after an elapse of a given delay time.

In the fifth embodiment, the side-collision units 90A and 90B for generating a gas by reacting a gas generating agent and a flammable agent are adopted. However, the present invention may be similarly applied to a vehicle comprising an air bag unit for generating a gas by other methods.

As many apparently widely different embodiments of the present invention can be made without departing from the spirit and scope thereof, it is to be understood that the invention is not limited to the specific embodiments thereof except as defined in the appended claims.

What is claimed is:

1. An energy absorbing structure for a vehicle body side portion, comprising:
   a pair of vehicle body members constituting two side portions of a vehicle body;
   a pair of collision detection means for respectively detecting collisions on two side surfaces of the vehicle body;
   one air bag which is mounted in each of said vehicle body members, can be unfolded toward an interior of a passenger room, and can receive at least one passenger who is moved sideways by a side collision in an unfolded state;
   timing varying means for changing unfolding timings of the two air bags in accordance with a side-collision direction on the basis of detection results from said collision detection means; and
   air bag unfolding means for unfolding the air bags in accordance with the unfolding timings set by said timing varying means.

2. The structure according to claim 1, wherein said timing varying means delays the unfolding timing of the air bag on a side opposite to a collision side from the unfolding timing of the air bag on the collision side by a predetermined period of time.

3. The structure according to claim 1, which further comprises:
   on-board state detection means for detecting an on-board state of passengers on right and left front seats.

4. The structure according to claim 3, wherein said on-board state detection means comprises seating sensors, stored in seat cushions of the right and left seats, for detecting on-board states of passengers on the corresponding seats.

5. The structure according to claim 3, wherein when said on-board state detection means detects that passengers sit on a collision side and on a side opposite to the collision side, said timing varying means causes the air bag on the collision side to unfold immediately after detection of the collision by said collision detection means, and causes the air bag on the side opposite to the collision side to unfold after an elapse of a first delay time from detection of the collision.

6. The structure according to claim 3, wherein when said on-board state detection means detects that a passenger sits on only a collision side, said timing varying means causes the air bag on the collision side to unfold immediately after detection of the collision by said collision detection means, and causes the air bag on the side opposite to the collision side to unfold after an elapse of a second delay time from detection of the collision.

7. The structure according to claim 3, wherein when said on-board state detection means detects that a passenger sits on only a side opposite to a collision side, said timing varying means causes the air bag on the collision side to unfold after an elapse of a third delay time from detection of the collision by said collision detection means.

8. The structure according to claim 1, wherein said vehicle body members comprise side doors, and
   said air bags are mounted to be unfolded from side surfaces of the corresponding side doors toward the interior of the passenger room.

9. The structure according to claim 8, wherein said side doors integrally comprise armrests, and
   said air bags are mounted to be unfolded from side surfaces of the corresponding armrests toward the interior of the passenger room.

10. The structure according to claim 8, wherein said side doors integrally comprise armrests, and
    said air bags are mounted to be unfolded from upper surfaces of the corresponding armrests toward the interior of the passenger room.

11. An energy absorbing structure for a vehicle body side portion, comprising:
    a pair of vehicle body members constituting two side portions of a vehicle body;
    a pair of collision detection means for respectively detecting collisions on two side surfaces of the vehicle body;
    a pair of air bags which are mounted in each of said vehicle body members, can be unfolded toward an interior of a passenger room, and can receive at least one passenger who is moved sideways by a side collision in an unfolded state;
    timing varying means for changing unfolding timings of the four air bags in accordance with a side-collision direction on the basis of detection results from said collision detection means; and
    air bag unfolding means for unfolding the air bags in accordance with the unfolding timings set by said timing varying means.

12. The structure according to claim 11, which further comprises:
    on-board state detection means for detecting an on-board state of passengers on right and left front seats.

13. The structure according to claim 12, wherein said pair of air bags mounted in each of said vehicle body members include a standard-size first air bag, and a second air bag larger than the first air bag.

14. The structure according to claim 13, wherein when said on-board state detection means detects that passengers sit on a collision side and on a side opposite to the collision side, said timing varying means causes the first air bag on the collision side to unfold immediately after detection of the collision by said collision detection means, and causes the second air bag on the side opposite to the collision side to unfold after an elapse of a first delay time from detection of the collision.

15. The structure according to claim 13, wherein when said on-board state detection means detects that a passenger sits on only a collision side, said timing varying means causes the first air bag on the collision side to unfold immediately after detection of the collision by said collision detection means, and causes the second air bag on the side opposite to the collision side to unfold after an elapse of a second delay time from detection of the collision.

16. The structure according to claim 13, wherein when said on-board state detection means detects that a passenger sits on only a side opposite to a collision side, said timing varying means causes the second air bag on the collision side to unfold after an elapse of a third delay time from detection of the collision by said collision detection means.

17. The structure according to claim 14, wherein said timing varying means causes the first air bag on the side opposite to the collision side to unfold after an elapse of a fourth delay time from unfolding of the second air bag on the side opposite to the collision side.

18. The structure according to claim 17, wherein the fourth delay time is set so that the first and second air bags are fully unfolded at substantially the same timings on the side opposite to the collision side.

19. The structure according to claim 15, wherein said timing varying means causes the first air bag on the side opposite to the collision side to unfold after an elapse of a fourth delay time from unfolding of the second air bag on the side opposite to the collision side.

20. The structure according to claim 19, wherein the fourth delay time is set so that the first and second air bags are fully unfolded at substantially the same timings on the side opposite to the collision side.

21. The structure according to claim 14, wherein said timing varying means causes the second air bag on the collision side to unfold simultaneously with unfolding of the first air bag on the collision side.

22. The structure according to claim 15, wherein said timing varying means causes the second air bag on the collision side to unfold simultaneously with unfolding of the first air bag on the collision side.

23. An energy absorbing structure for a vehicle body side portion, comprising:
   a pair of vehicle body members constituting two side portions of a vehicle body;
   a pair of collision detection means for respectively detecting collisions on two side surfaces of the vehicle body;
   one air bag which is mounted in each of said vehicle body members, a portion of which can be unfolded toward an interior of a passenger room as a first air bag portion having a standard size, the remaining portion of which can be unfolded as a second air bag portion larger than the first air bag portion, and which can receive at least one passenger who is moved sideways by a side collision in an unfolded state of each of the first and second air bag portions;
   timing varying means for changing unfolding timings of the four air bag portions in accordance with a side-collision direction on the basis of detection results from said collision detection means; and
   air bag unfolding means for unfolding the air bag portions in accordance with the unfolding timings set by said timing varying means.

24. The structure according to claim 23, wherein said air bag is arranged so that the first and second air bag portions are integrally unfolded in a last process of an unfolding operation.

25. The structure according to claim 23, wherein said timing varying means causes the second air bag portion to unfold after an elapse of a predetermined period of time from unfolding of the first air bag portion.

26. The structure according to claim 25, wherein when a side collision is detected on the basis of detection results from said collision detection means, said timing varying means simultaneously starts unfolding of the first air bag portions of the air bags on a collision side and on a side opposite to the collision side.

27. An energy absorbing structure for a vehicle body side portion, comprising:
   a pair of vehicle body members constituting two side portions of a vehicle body;
   a pair of collision detection means for respectively detecting collisions on two side surfaces of the vehicle body;
   a pair of large and small air bags which are mounted in each of said vehicle body members, can be independently unfolded toward an interior of a passenger room, and can receive at least one passenger who is moved sideways by a side collision in an unfolded state;
   timing varying means for changing timings up to fully unfolded states of the four air bags in accordance with a side-collision direction on the basis of detection results from said collision detection means; and
   air bag unfolding means for unfolding the air bags in accordance with the timings set by said timing varying means.

28. The structure according to claim 27, wherein said timing varying means variably sets time intervals up to fully unfolded states on the basis of sizes of the air bags.

29. The structure according to claim 28, which further comprises:
   on-board state detection means for detecting an on-board state of passengers on right and left front seats.

30. The structure according to claim 29, wherein when said on-board state detection means detects that a passenger sits on a collision side, and when a side collision is detected on the basis of the detection results from said collision detection means, said timing varying means causes the small air bag on the collision side and the large air bag on the side opposite to the collision side to simultaneously unfold.

31. The structure according to claim 29, wherein when said on-board state detection means detects that a passenger sits on only a side opposite to a collision side, and when a side collision is detected on the basis of the detection results from said collision detection means, said timing varying means causes the large air bag on the collision side to unfold.

* * * * *

UNITED STATES PATENT AND TRADEMARK OFFICE
CERTIFICATE OF CORRECTION

PATENT NO. : 5,072,966

DATED : December 17, 1991

INVENTOR(S) : Hideki Nishitake et al.

It is certified that error appears in the above-identified patent and that said Letters Patent is hereby corrected as shown below:

column 4, line 33:
after "as is" delete "one" and insert therefor --subroutine--;

column 6, line 7:
"ignitionddevice" should be --ignition device--;

column 6, line 56:
"12A and 12" should be --12A and 12B--;

column 7, line 52:
"shownin" should be --shown in--;

column 8, line 66:
"appassenger" should be --a passenger--;

column 15, line 20:
"ith" should be --with--;

column 18, line 60:
"$16A_2$ or $16A_2$" should be --$16A_1$ or $16A_2$--;

column 18, line 68:
"te capacities" should be --the capacities--;

column 19, line 21:
"$33A_2$, $33A_2$" should be --$33A_1$, $33A_2$--;

column 19, line 48:
"13A" should be --$13A_1$--;

column 20, line 47:
"12B" should be --$12B_1$-- column 23, line 37:
"13B" should be --$13B_1$--;

UNITED STATES PATENT AND TRADEMARK OFFICE
CERTIFICATE OF CORRECTION

PATENT NO. : 5,072,966

DATED : December 17, 1991

INVENTOR(S) : Hideki Nishitake et al.

It is certified that error appears in the above-identified patent and that said Letters Patent is hereby corrected as shown below:

column 23, line 56:
"161 ss" should be --161 is--;

column 24, line 4:
"fourhh" should be --fourth--;

column 24, line 17:
after "$13B_1$" insert --and--;

column 24, line 34:
"devices $12A_2$" should be --devices $12A_1$--;

column 25, line 46:
"$80A_1$" should be --80A--;

column 26, line 28:
"$92_2$" should be --$92A_2$--;

column 26, line 56:
"93A and 93B" should be --$93A_1$ and $93B_1$--.

Signed and Sealed this

Twelfth Day of October, 1993

Attest:

BRUCE LEHMAN

*Attesting Officer*     *Commissioner of Patents and Trademarks*